(12) United States Patent
Tateyama

(10) Patent No.: US 6,711,637 B2
(45) Date of Patent: Mar. 23, 2004

(54) COMMUNICATION APPARATUS, IMAGE PROCESSING APPARATUS, COMMUNICATION SYSTEM, COMMUNICATION METHOD, IMAGE PROCESSING METHOD AND STORAGE MEDIUM

(75) Inventor: Jiro Tateyama, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 09/750,714

(22) Filed: Jan. 2, 2001

(65) Prior Publication Data

US 2001/0013949 A1 Aug. 16, 2001

(30) Foreign Application Priority Data

Jan. 11, 2000 (JP) ........................................ 2000-002958
Jan. 11, 2000 (JP) ........................................ 2000-002959

(51) Int. Cl.⁷ ........................... G06F 13/14; G06F 13/16
(52) U.S. Cl. ............................ 710/65; 710/15; 710/16; 710/62; 710/67
(58) Field of Search ........................... 710/15, 16, 65, 710/67, 62

(56) References Cited

U.S. PATENT DOCUMENTS

| | | | | |
|---|---|---|---|---|
| 4,930,017 A | * | 5/1990 | Izawa | ........................... 358/296 |
| 5,550,586 A | * | 8/1996 | Kudo et al. | ............... 348/222.1 |
| 5,606,365 A | * | 2/1997 | Maurinus et al. | ......... 348/222.1 |
| 5,623,311 A | * | 4/1997 | Phillips et al. | .......... 375/240.25 |
| 5,767,947 A | * | 6/1998 | Schindler et al. | .............. 355/40 |
| 5,768,444 A | * | 6/1998 | Nishimura | .................... 382/298 |
| 5,890,184 A | * | 3/1999 | Ooishi | .......................... 715/542 |
| 6,097,558 A | * | 8/2000 | Oguro | ........................... 360/22 |
| 6,298,196 B1 | * | 10/2001 | Shima et al. | ................... 386/94 |
| 6,504,960 B2 | * | 1/2003 | Takahashi | .................... 382/305 |
| 6,552,743 B1 | * | 4/2003 | Rissman | .................... 348/207.2 |

OTHER PUBLICATIONS

U.S. patent application Ser. No. 09/025,129, filed Feb. 17, 1998.
U.S. patent application Ser. No. 09/025,128, filed Feb. 17, 1998, now U.S. Pat. No. 6,425,019.

* cited by examiner

Primary Examiner—Rehana Perveen
(74) Attorney, Agent, or Firm—Fitzpatrick, Cella, Harper & Scinto

(57) ABSTRACT

For providing a communication system capable of easily and efficiently confirming information present in another device and easily and efficiently selecting desired information from such information, a digital camera informs a printer of format information of an image file (including a photographed image, a thumbnail image formed by reducing the photographed image) held in an internal memory of the digital camera, so that the printer can directly fetch the thumbnail image only from the image file held in the internal memory of the digital camera, for example by the pull-type data transfer method.

39 Claims, 28 Drawing Sheets

FIG. 10

| COMMAND CLASSIFICATION | command | response | |
|---|---|---|---|
| STATUS | Getstatus | GetstatusResponse | 271 |
| CONTROL | PrintReset | PrintResetResponse | 272 |
| | PrintStart | PrintStartResponse | 273 |
| | PrintStop | PrintStopResponse | 274 |
| | InsertPaper | InsertPaperResponse | 275 |
| | EjectPaper | EjectPaperResponse | 276 |
| | CopyStart | CopyStartResponse | 277 |
| | CopyEnd | CopyEndResponse | 278 |
| BLOCK/ BUFFER | BlockSize | BlockSizeResponse | 279 |
| | BlockAddress | BlockAddressResponse | 280 |
| | FreeBlock | FreeBlockResponse | 281 |
| | WriteBlocks | WriteBlocksResponse | 282 |
| | BufferConfig | BufferConfigResponse | 283 |
| | SetBuffer | SetBufferResponse | 284 |
| CHANNEL | OpenChannel | OpenChannelResponse | 285 |
| | CloseChannel | CloseChannelResponse | 286 |
| TRANSFER | TransferMethod | TransferMethodResponse | 287 |
| FORMAT | SetFormat | SetFormatResponse | 288 |
| LOGIN | Login | LoginResponse | 289 |
| | Logout | LogoutResponse | 290 |
| | Reconnect | ReconnectResponse | 291 |
| DATA | WriteBlock | | 292 |
| | WriteBuffer | | 293 |
| | PullBuffer | | 294 |

306a(305b)

format [2] — Raw RGB format

- inX-rate — 351
- inY-rate — 352
- outX-rate — 353
- outY-rate — 354
- XY-size — 355
- bit-pixel — 356
- X-size — 357
- Y-size — 358
- plane — 359
- X-resolution — 360
- Y-resolution — 361
- pixel-format — 364

| EXIF(TIFF, JPEG) | UNCOMPRESSED DATA AND COMPRESSED DATA OF EXIF |
|---|---|
| TIFF/EP | EXTENDED VERSION OF TIFF |
| REG | REG LOW IMAGE |
| YUV | YUV LOW IMAGE |
| YCrCb | YCrCb LOW IMAGE |
| CMYK | CMYK LOW IMAGE |
| Vender Specific | VENDER DEFINITION |

FIG. 23

| | DATA VALUE | MEANING OF DATA | |
|---|---|---|---|
| x000h | 00010000 | START OF EXIF DATA (0x100) | |
| | 07000000 | SIZE OF EXIF DATA (1792BYTE) | 421 |
| | | | |
| x100h | | | |
| | 87690400 | TAG OF OWN INFORMATION OFFSET | |
| | 00010000 | OFFSET (0x100) | 422a |
| | | | |
| | 00020000 | THUMBNAIL OFFSET (0x200) | |
| | | | |
| x200h | | | |
| | 03900200 | TAG OF PHOTOGRAPHING TIME | 422b |
| | 14000000 | THE NUMBER OF BYTE (20BYTE) | |
| | C4010000 | OFFSET (0x1c4) | |
| | | | |
| x2C4h | 31393937 | 1997 | |
| | 3A30373A | :07: | |
| | 30362031 | 06 1 | |
| | 323A3336 | 2:36 | |
| | 3A313000 | :10. | |
| | | | |

FIG. 24

| DATA VALUE | MEANING OF DATA |
|---|---|
| | |
| 11010000 | TAG OF THUMBNAIL OFFSET |
| 20020000 | OFFSET (0x220) |
| | |
| 17010000 | TAG OF THUMBNAIL SIZE |
| C0120000 | THE NUMBER OF BYTE (4800BYTE) |
| | |
| | THUMBNAIL IMAGE DATA |
| | | x300h (top)
x320h
422c

COMMUNICATION APPARATUS, IMAGE PROCESSING APPARATUS, COMMUNICATION SYSTEM, COMMUNICATION METHOD, IMAGE PROCESSING METHOD AND STORAGE MEDIUM

BACKGROUND OF THE INVENTION

1. Field of the Invention

The present invention relates to a communication apparatus, an image processing apparatus, a printer, a communication system, a printing system, a communication method and an image processing method for executing data transfer between devices in one-to-one relationship through a serial interface such as IEEE1394, and a storage medium storing process steps for executing such methods in computer readable manner.

2. Related Background Art

For example for printing an image photographed with a digital camera by a printer, there is already known a method utilizing a personal computer (PC).

In such method, a PC and a digital camera are connected by a serial interface (such as RS-232C) and the PC and a printer are connected by a parallel interface (such as Centronics).

Then the photographed image is transferred from the digital cameral to the PC and is thus fetched therein.

Then on such PC, the photographed image is fetched from the digital camera is processed according to the desired printing format, by an arbitrary application software functioning on the PC.

Subsequently the photographed image thus processed is transferred from the PC to the printer and is printed on the printer.

However, such output method for the photographed image utilizing PC is dependent on a fact that the user already has the PC.

Therefore, the user who does not have the PC (for example a user who does not have the PC but has purchased a digital camera) cannot print the image photographed by the digital camera on the printer unless a PC is prepared (for example by new purchasing).

For this reason, there is proposed a system (hereinafter called "direct print system") in the form of a dye sublimation video printer, capable of directly printing the image, photographed by the digital camera, without utilizing the PC.

In such direct print system, the photographed image is transferred from the digital camera to the printer by directly connecting the digital camera with the printer, without going through the PC, by a serial interface of an independent format, or utilizing the standard IrTran-P format utilizing infrared light, or utilizing a memory card interface such as the compact flush or the smart media.

In the above-mentioned direct print system, in case the user wishes to select a photographed image to be printed on the printer, among various images photographed with the digital camera, the user connects the video output terminal of the printer to a home television unit to display a menu image (index image) in which thumbnail images (images for confirmation, each reduced to an image size of about 80×60 dots, from the actual photographed image) corresponding to the various photographed images and selects the desired photographed image on such menu image.

The menu image for confirmation and selection of the photographed images on the home television unit because a display unit capable of displaying such menu image cannot be provided on the printer itself in consideration of the cost and space.

However, the usual home television set has a relatively low resolution of about 720×480 dots in comparison with the monitors employed for the PC's.

It is therefore difficult to confirm the photographed image by the thumbnail image displayed in the menu image on the home television set.

Also, in order to increase the number of the photographed images that can be confirmed at a time on the menu image, namely in order to increase the number of the thumbnail images that can be simultaneously displayed on the menu image, the size of each thumbnail image has to be accordingly made smaller, so that the confirmation of the photographed image becomes more difficult.

Therefore, the number of the photographed images that can be confirmed at a time on the menu is inevitably limited.

Instead, it is conceivable to display the menu image on the liquid crystal display unit provided on the digital camera, but, because such liquid crystal display unit has a small image size with a low resolution, the number of the photographed image which can be confirmed at a time is still limited in such configuration.

The above-mentioned limitation in the number of the photographed images which can be confirmed at a time is very inconvenient in the recent situation where the number of the photographed images that can be accumulated in the digital camera has become large with the increase in the memory size provided in the digital camera and it is requested to accordingly increase the number of the photographed images which can be confirmed at a time thereby enabling efficient confirmation and selection of the photographed images.

For this reason, there is provided a method of printing a list of thumbnail images (index print) of the photographed images, instead of displaying the menu image, for confirmation and selection of the photographed images, on the home television set or the liquid crystal display unit of the digital camera.

Thus the user is enabled to confirm all the photographed images accumulated in the digital camera and to select the photographed image desired for actual print.

More specifically, in the digital camera, the photographed images are stored as an image file in an image file format such as EXIF or CIFF, together with the corresponding thumbnail images.

In order to extract all the thumbnail images only from such image file and to print a list of such thumbnail images, there are executed following first to fourth processes.

first process: All the image file retained in the digital camera is transferred to the printer;

second process: Then, in the printer, the thumbnail images only are extracted from the image file;

third process: There is generated a list image of the thumbnail images extracted in the second process; and fourth process: Then the list image generated in the third process is printed.

However, in the above-described method of printing all the photographed images retained in the digital camera as a list (index print) of the corresponding thumbnail images through the aforementioned first to fourth processes for the purpose of confirmation and selection of such photographed images, there is required a significant burden with a long time in the data transfer between the digital camera and the printer and in the image processing (generation of the list image of the thumbnail images) and the printing process executed in the printer.

SUMMARY OF THE INVENTION

An object of the present invention is to resolve all the above-mentioned drawbacks or at least one thereof.

Another object of the present invention is to provide an image processing apparatus or a communication apparatus capable of easily and efficiently confirming the information present in a first device and easily and efficiently selecting desired information among such existing information.

The above-mentioned objects can be attained, according to the present invention, by a communication apparatus comprising a communication unit for fetching format of held information held in another device by communication therewith; and a control unit for controlling the fetching of the held information based on the format of the held information, fetched from the another device.

Still another object of the present invention is to easily and efficiently confirm information present in a first device thereby reducing the process time.

The above-mentioned object can be attained, according to the present invention, by an image processing apparatus capable of fetching image information held in another device through a communication unit, comprising an information fetching unit for executing information fetching process of image information from the aforementioned another device based on the format information of the held image information informed from the aforementioned another device; an information generation unit for generating index information in which plural image information fetched by the information fetching unit are arranged in an arbitrary order; an outline extraction unit for applying an outline extraction process on the image information constituting the index information generated by the information generation unit; and an information output unit for outputting the index information after processing by the outline extraction unit.

Still other objects of the present invention, and the features thereof, will become fully apparent from the following detailed description of the embodiments, to be taken in conjunction with the accompanying drawings.

BRIEF DESCRIPTION OF THE DRAWINGS

FIG. 10 is a view showing an example of command and response between the image source device (digital camera) and the printer;

FIG. 23 is a view showing an EXIF header and a TIFF data portion (JPEG image area and digital camera information area 422b) in the above-mentioned image file;

FIG. 24 is a view showing a TIFF data portion (thumbnail image area 422c) of the above-mentioned image file;

DETAILED DESCRIPTION OF THE PREFERRED EMBODIMENTS

Now the present invention will be clarified in detail by preferred embodiments thereof, with reference to the accompanying drawings.

First Embodiment

Figure 1:
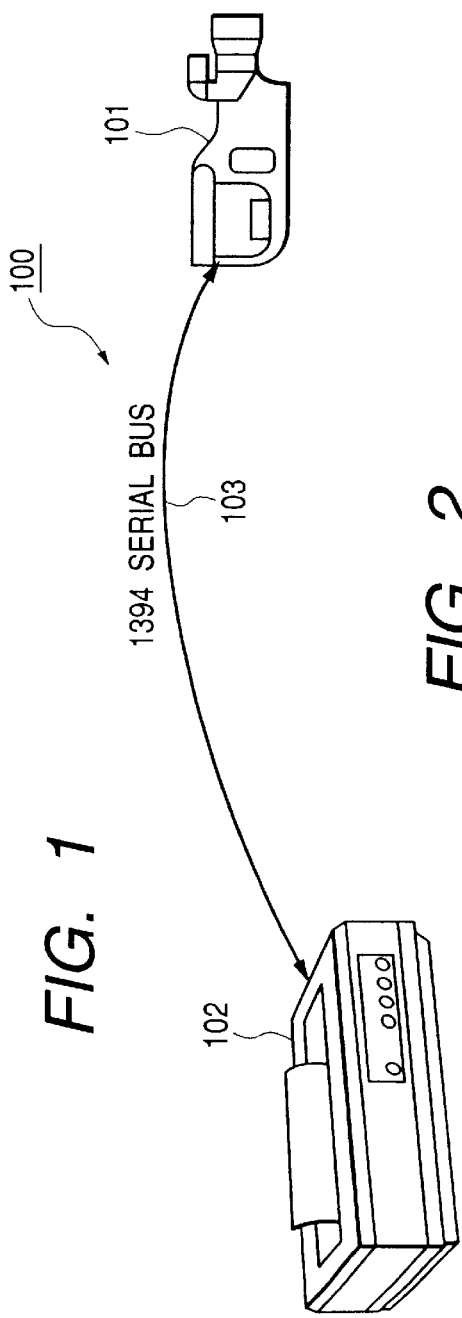
FIG. 1 is a block diagram showing the configuration of a communication system embodying the present invention.

The present embodiment is applicable for example to a communication system 100 shown in FIG. 1. The communication system 100 is a direct print system capable of printing a photographed image held in a digital camera 101 by a printer 102 without relying on a personal computer (PC) or the like, and is composed, as shown in FIG. 1, of a digital camera 101 constituting an image input device (first device) and a printer 102 constituting an image output device (second device), so connected as to be capable of communication through a 1394 serial bus constituting communication means and to be explained later.

The communication means (interface) in the direct print system but can be composed of various other interfaces, but, is composed of the 1394 serial bus. Therefore, in the following, there will at first be explained the outline of the "IEEE1394" defining the 1394 serial bus and then the detailed configuration and function of the communication system 100 in the present embodiment.

Outline of IEEE1394 Technology

With the recent progress in the home digital VCR, DVD etc., there is required to support the real-time transfer of data of a large information amount such as video data or audio data.

In order to transfer the video or audio data on real-time basis for fetching into the personal computer (PC) or to other digital devices, there is required an interface capable of high-speed data transfer with necessary transfer function.

Based on such standpoint, there is developed an interface IEEE1394–1995 (high performance serial bus) (hereinafter called "1394 serial bus").

Figure 2:
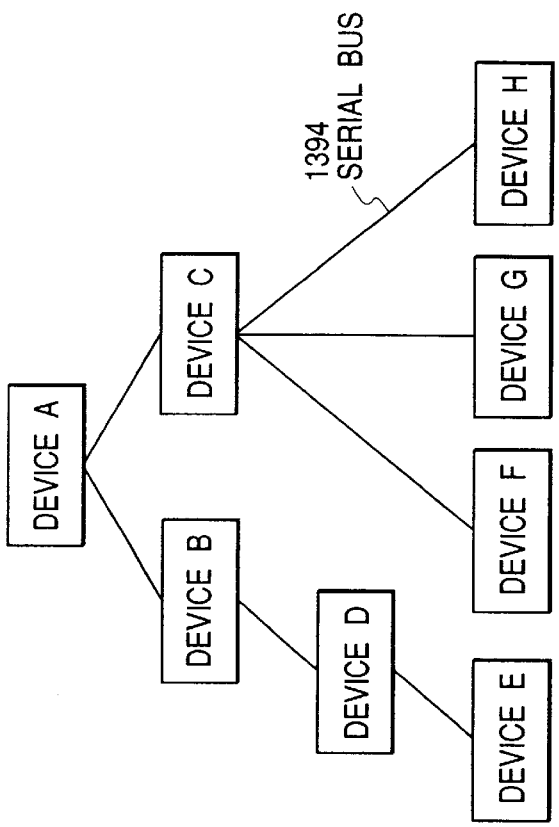
FIG. 2 is a view showing a network system constituted with IEEE1394 serial buses, for the purpose of outlining the "IEEE1394" defining the above-mentioned 1394 serial buses to be used as the communication means in the above-mentioned communication system.

FIG. 2 shows an example of the network system constructed with such 1394 serial bus.

The network system is provided with digital devices (hereinafter merely called devices) A, B, C, D, E, F, G and H, and the devices A-B, A-C, B-D, D-E, C-F, C-G and C-H are respectively connected with a twisted pair cable of the 1394 serial bus (hereinafter called "1394 serial bus cable").

The devices A to H can be composed, for example, of a PC, a digital VCR, a DVD, a digital camera, a hard disk, a monitor etc.

The devices A, B, C, D, E, F, G and H can be connected by the daisy chain method or the node branching method in a mixed manner, so that a high freedom can be attained in the connection.

Each of the devices A to H is provided with a specific ID, and such ID's are mutually recognized by the devices to constitute a network within the extent of the devices connected with the 1394 serial bus cables.

Thus, by connecting the devices A, B, C, D, E, F, G and H in succession with a 1394 serial bus between each pair of devices, the devices A, B, C, D, E, F, G and H respectively execute relaying function to constitute a single network.

Also the 1394 serial bus has a plug and play function in which, when the 1394 serial bus is connected to a device, such device automatically recognizes its own device and the connection status.

Thus, when an arbitrary device X is deleted or added in the network system shown in FIG. 2, the plug and play function automatically executes bus resetting, whereby the prior network configuration is reset and a new network is reconstructed.

Also the network configuration is from time to time set and recognized.

The 1394 serial bus has a data transfer rate of 100/200/400 Mbps, and a device having an upper transfer rate supports a device having a lower transfer rate to achieve mutual compatibility.

As the data transfer mode, the 1394 serial bus has a synchronous transfer mode for transferring asynchronous data (hereinafter called "async data") such as a control signal, and a isochronous transfer mode for transferring isochronous data (hereinafter called "iso data") such as real-time video or audio data.

The async data and iso data are transferred in a mixed manner within each cycle (usually 125 $\mu$s), succeeding to the transfer of a cycle start packet (CSP) indicating the start of a cycle and giving priority to the transfer of the iso data.

Figure 3:
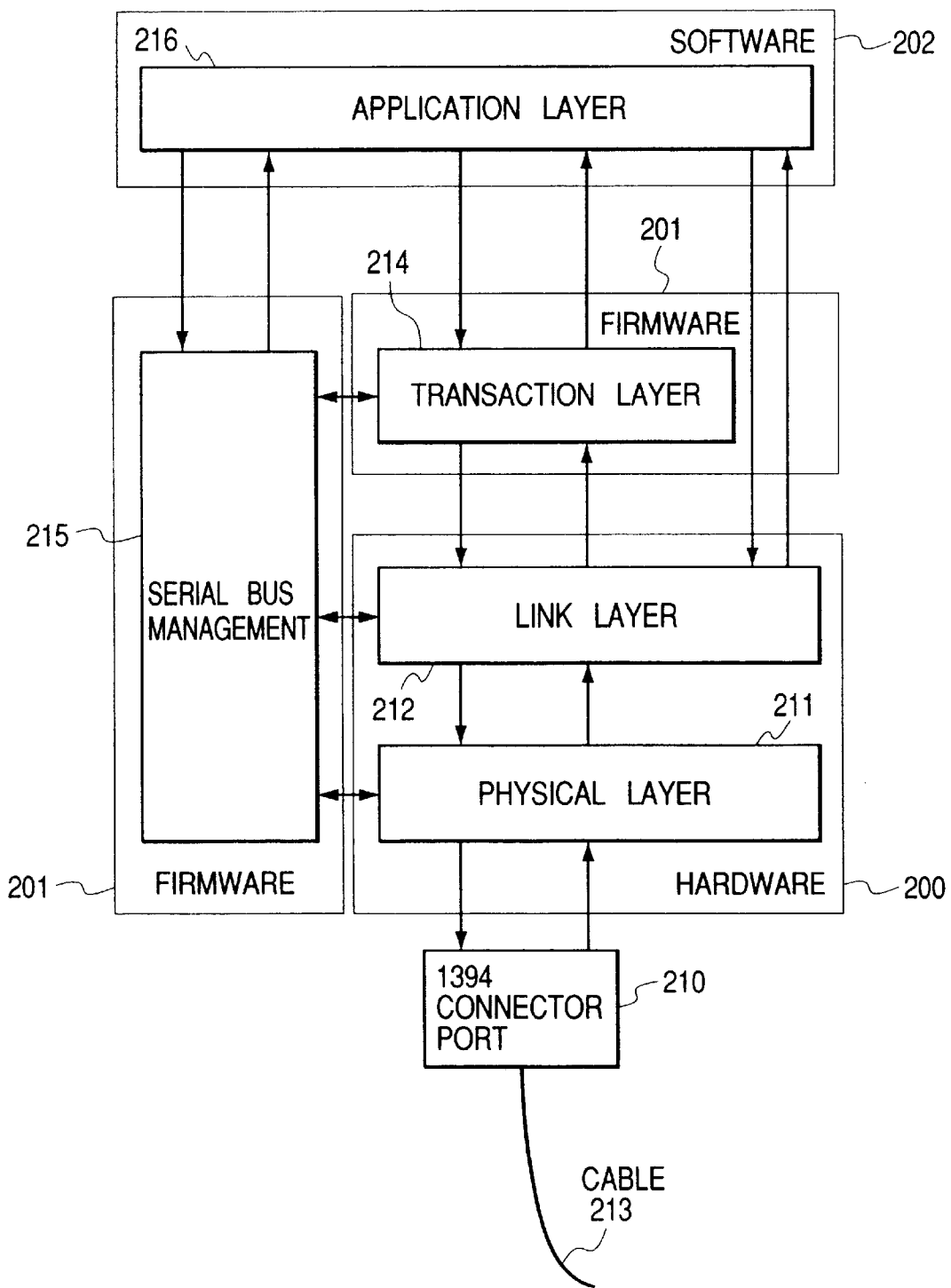
FIG. 3 is a view showing the configuration of the above-mentioned 1394 serial bus.

FIG. 3 shows components constituting the 1394 serial bus.

As shown in FIG. 3, the 1394 serial bus has a hierarchic structure composed in succession of a cable 213 of the 1394 serial bus, a hardware 200, a firmware 201 and a software 202.

The cable 213 of the 1394 serial bus is a hardware component of which connector is connected to a connector port 210.

The hardware 200 substantially constitutes the interface and includes a physical layer 211 and a link layer 212.

The physical layer 211 executes encoding and control related to the connector, while the link layer 212 executes packet transfer and control of the cycle time.

The firmware 201 includes a transaction layer 214 and a management layer 215.

The transaction layer 214 manages data to be transferred (transaction) and issues commands such as "read" and "write".

The management layer 215 manages the connection status of the devices and ID's, thus managing the configuration of the network.

The above-mentioned hardware 200 and firmware 201 substantially constitute the 1394 serial bus.

The software 202 includes an application layer 216.

The application layer 216, being variable depending on the software to be used, defines for example how the data are to be put on the interface, and is defined by the data transfer protocol such as AV/C protocol.

Figure 4:
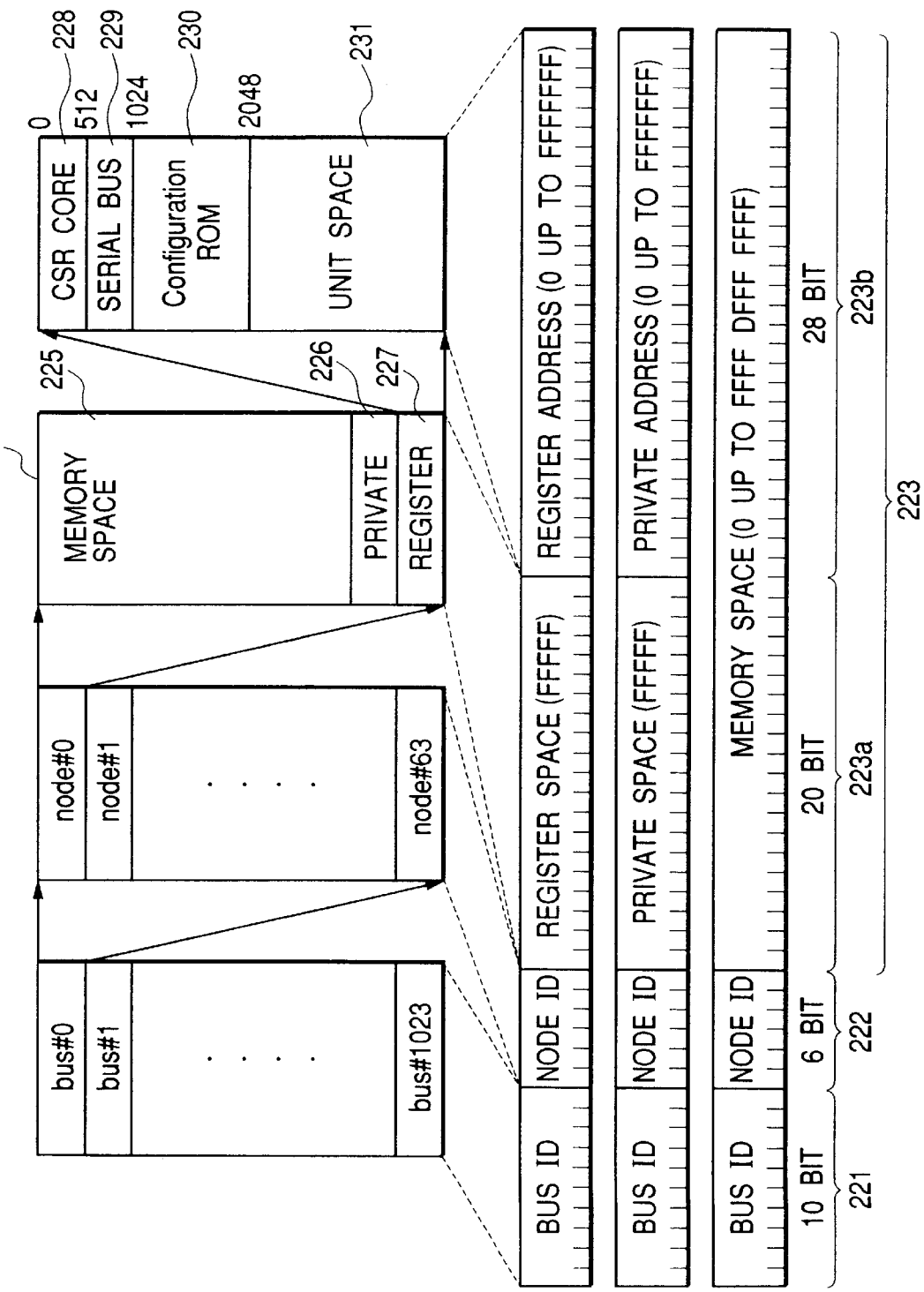
FIG. 4 is a view showing the address space in the above-mentioned 1394 serial bus.

FIG. 4 shows the address space in the 1394 serial bus.

Each device (hereinafter also called "node") connected by the 1394 serial buses as shown in FIG. 2 is always given an address of 64 bits, specific to each device.

Each device sets such address in a ROM in the own device, whereby it can always recognize the node address of the self device or another device constituting the partner in connection, thereby being capable of communication with a designated device.

The addressing on the 1394 serial bus is executed by a method based on the IEEE1212 standard.

In this method, within the 64-bit address shown in FIG. 4, the first 10 bits (221) are used for designating a bus number (bus ID), and the succeeding 6 bits (222) are used for designating a node ID number (node ID).

The subsequent 48 bits (223) can be used by each device, and are divided into 20 bits (223a) and 28 bits (223b) and utilized with a structure of a unit of 256 Mbytes (224).

In an address area (224) constituted by the initial 20 bits (223a) within the 48 bits (223), an area 225 indicated by addresses 0 to 0×FFFFD is called a memory space while an area 226 indicated by a next address 0×FFFFE is called a private space that can be arbitrarily used by each device.

Also an area 227 indicated by a next address 0×FFFFF is called a register space used for setting common information between the devices connected to the bus and used for communication between the devices.

In the register space 227, an initial 512-byte area 228 is used as a register (CSR core) constituting the core of the CSR architecture.

A next 512-byte area 229 is used as a register for the serial bus.

A next 1024-byte area 230 is used as a configuration ROM.

A subsequent area 231 is used as a unit space (register specific to the device).

For generally simplifying the design of different bus systems, it is desirable that each device uses only the initial 2048-byte area in the unit space 231.

In such case there can be used 4096 bytes constituted by the CSR core 228 of the CCSR architecture, the register 229 of the serial bus, the configuration ROM 230 and the initial 2048 bus of the unit space 231.

Electrical Specification of the 1394 Serial Bus

Figure 5:
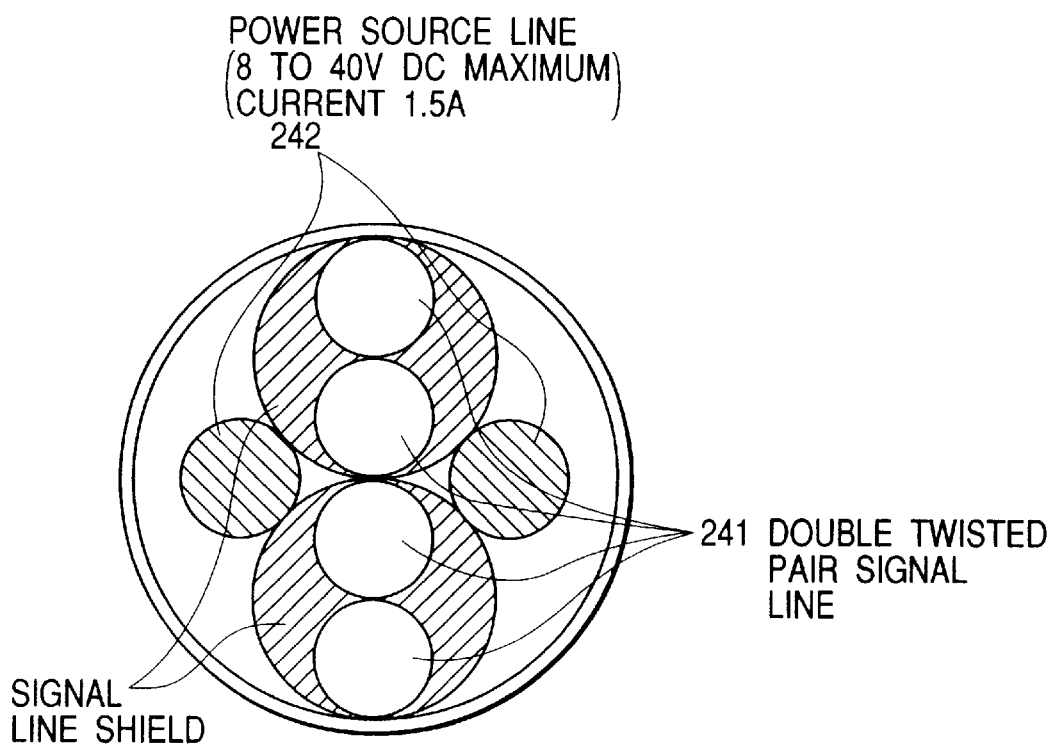
FIG. 5 is a view showing the cable structure of the above-mentioned 1394 serial bus.

FIG. 5 is a cross-sectional view of the 1394 serial bus cable.

As shown in FIG. 5, the 1394 serial bus cable contains two sets of twisted pair signal lines 241 and power source lines 242.

The power source lines 242 enables power supply to a device lacking the power source or a device in which the power supply voltage is lowered by a failure.

The power source lines 242 are defined with a voltage of 8 to 40 V and a maximum current of DC 1.5 A.

DS-Link Encoding

Figure 6:
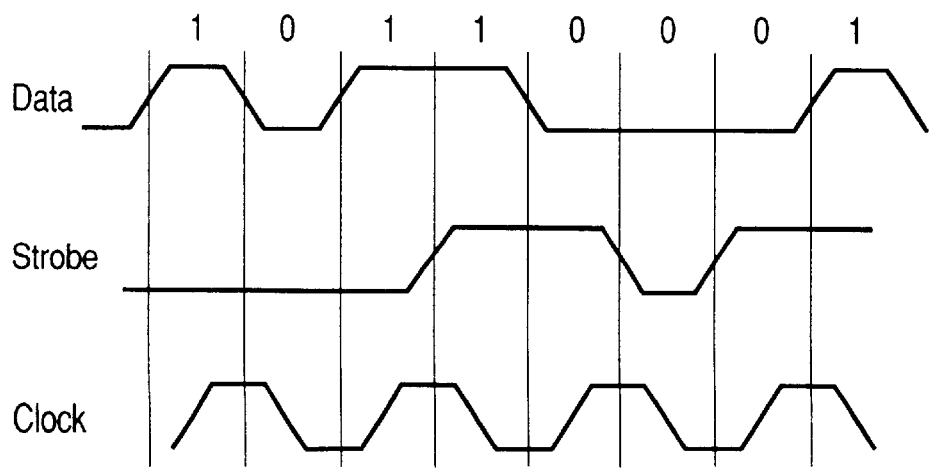
FIG. 6 is a view showing the data transfer (data transfer by DS-link encoding) in the above-mentioned 1394 serial bus.

The data transfer format employed in the 1394 serial bus will be explained with reference to FIG. 6.

The 1394 serial bus employs the DS-link (data/strobe link) encoding as the data transfer format.

Such DS-link encoding method is suitable for high-speed serial data communication.

More specifically, the DS-link encoding method requires two signal lines, of which one is used for transmitting main data while the other is used for transmitting a strobe signal.

The receiving side for the data and the strobe signal can reproduce the clock signal by calculating the exclusive logic sum of the data and the strobe signal.

The above-described DS-link encoding provides the following advantages:
  a higher transfer efficiency in comparison with other serial data transfer methods;
  magnitude of the controller LSI circuit can be reduced because the PLL circuit can be dispensed with; and
  in the absence of the data to be transferred, the transceiver circuit of each device can be put in the sleep state, since it is not necessary to transmit information indicating an idle state.

It is thus made possible to reduce the electric power consumption.

Sequence for Node ID Determination

As explained in the foregoing, when an arbitrary device is deleted or newly added, the plug and play function automatically executes bus resetting, whereby the prior network configuration is reset and a new network is reconstructed.

Figure 7:
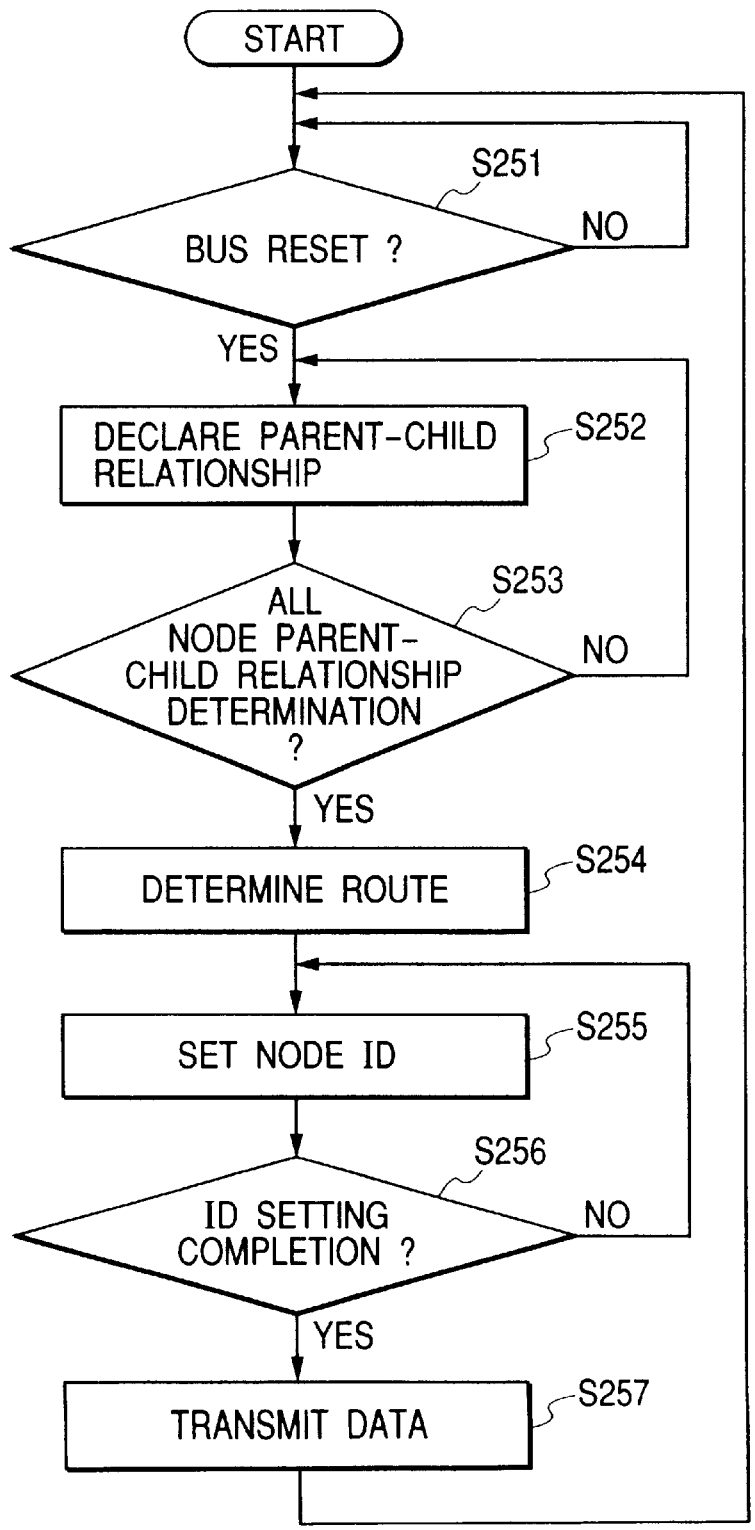
FIG. 7 is a view showing the plug and play function in the above-mentioned 1394 serial bus.

After the bus resetting, each device executes an operation according to a flow chart shown in FIG. 7 (operation for giving ID to each device), in order to construct a new network configuration.

More specifically, the flow chart in FIG. 7 shows the operations from the occurrence of the bus resetting to the determination of the node ID in each device and the transfer of such node ID.

At first, each device constantly monitors whether a bus resetting occurs in the network (step S251).

When a bus resetting occurs for example by turning on/off of the power supply in an arbitrary device in the network, each device declares a parent-child relationship with a device directly connected to the self device, in order to recognize the connection status of the new network, starting from the reset state of the network (step S252).

When the step S252 determines the parent-child relationship among all the devices (step S253), there is determined, as a result, a root device (step S254).

When the step S254 determines the root device, each devices executes a node ID setting operation for giving the node ID of the self device to other devices (step S255).

The not ID setting operation is executed in a predetermined order of devices.

When the step S255 completes the node ID setting operation for all the devices (step S256), the new network configuration is recognized by all the devices.

Thus each device is rendered capable of executing data transfer with other devices, and initiates the data transfer according to the necessity (step S257).

Then there is again assumed a mode of monitoring whether the bus resetting occurs (step S251), and, in response to the occurrence of a bus resetting, the process of the aforementioned steps S252 to S257 is repeated.

Direct Print Protocol (DPP)

The communication system 100 of the present embodiment shown in FIG. 1 employs the direct print protocol (DPP) as the data transfer sequence between the printer 102 and the digital camera 101.

Figure 8:
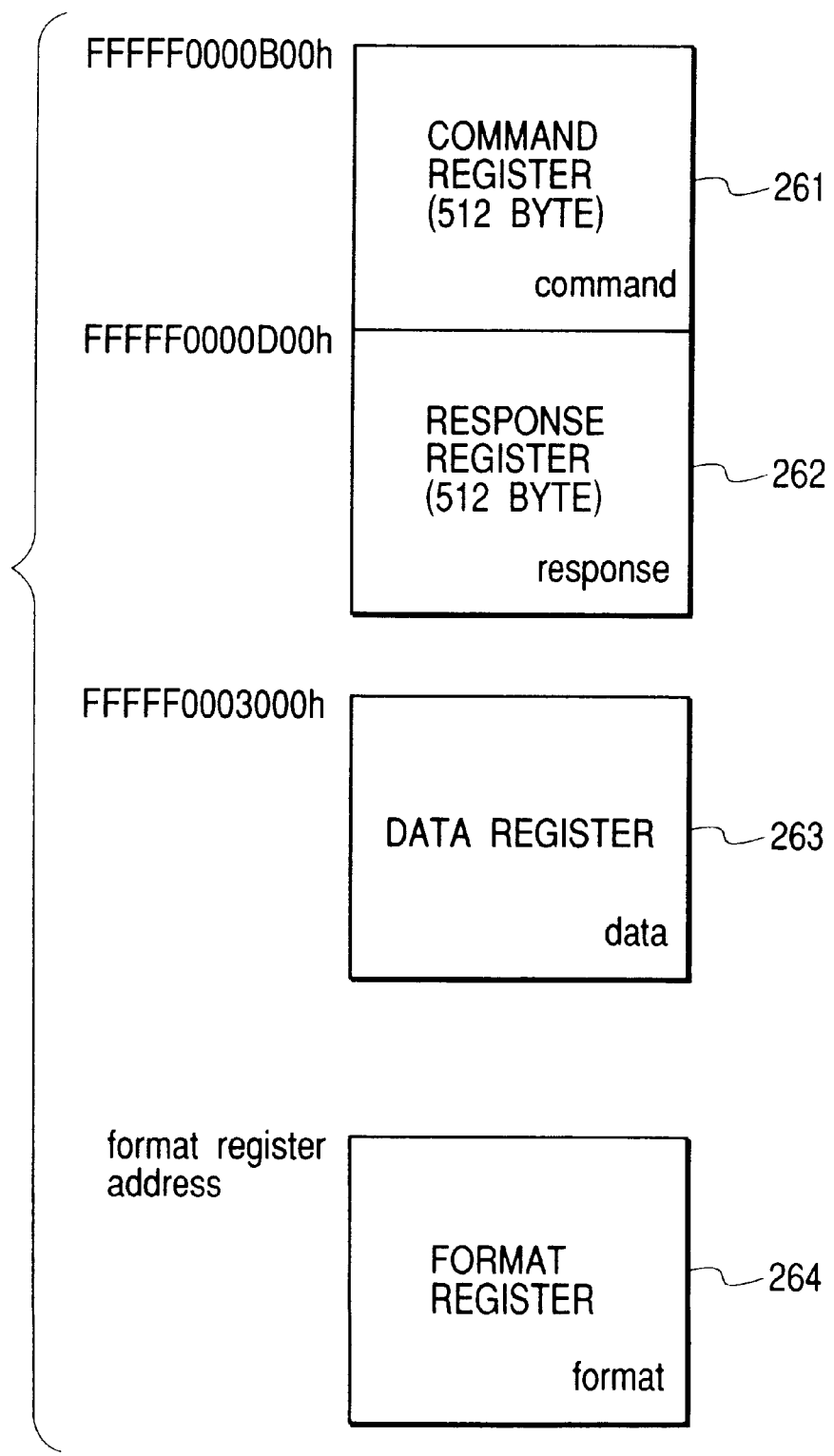
FIG. 8 is a view showing a register to be used for data transfer between an image source device (digital camera) and a printer in the above-mentioned communication system.

The direct print protocol (DPP) utilizes, in the initial unit space (unit space 231 shown in FIG. 4) as shown in FIG. 8, a command register 261 for command writing, a response register 262 for writing a response to the command, a data register 263 for writing transfer data, and a format register 254 for storing format information corresponding to the data format of the individual transfer data.

In FIG. 8, the addresses are shown without the initial "FFFF".

The command register 261 is provided at a fixed address "FFFF0000B00"h and has a space of 512 bytes.

In the present embodiment, the command register 261 is used by the digital camera 101 (image source device) for writing various commands (hereinafter also called "command frame") to the printer 102, and is provided on the printer side.

The command register 261 is also provided on the digital camera 101 and is used by the printer 102 for writing various commands to the command register 261 of the digital camera 101.

The response register 262 is provided at a fixed address "FFFF0000D00"h and has a space of 512 bytes.

In the present embodiment, the response register 262 is used by the printer 102 for writing responses (hereinafter also called "response frame") to the various commands written in the command register 261 by the digital camera 101, and is provided on the digital camera side.

The response register 262 is also provided on the printer 102 and is used by the digital camera 101 for writing responses to the response register 262 of the printer 102.

The data register 263 has a default address "FFFFF0003000"h, and can be set at an effective arbitrary address by a BlockAddressBufferConfig command for defining the address of the data register 263.

Also the space of the data register 263 can be set within a predetermined range by a BlockSizeBufferConfig command for defining the space of the data register 263.

In the present embodiment, the data register 263 is used for executing data transfer between the digital camera 101 and the printer 102, and, in case of print output by the printer 102, the print data (hereinafter also called "data frame") to be printed by the printer 102 are written by the digital camera 101.

The print data in such case are formed with a data format according to a preset image format.

The format register 264 is composed of a group of registers corresponding to the respective data formats to be explained later, and each of such registers is used for setting the format information (hereinafter also called "format frame") required for each data format.

In the present embodiment, the format register 264 is used by the digital camera 101 for writing the format information for the printer 102.

Figure 9:
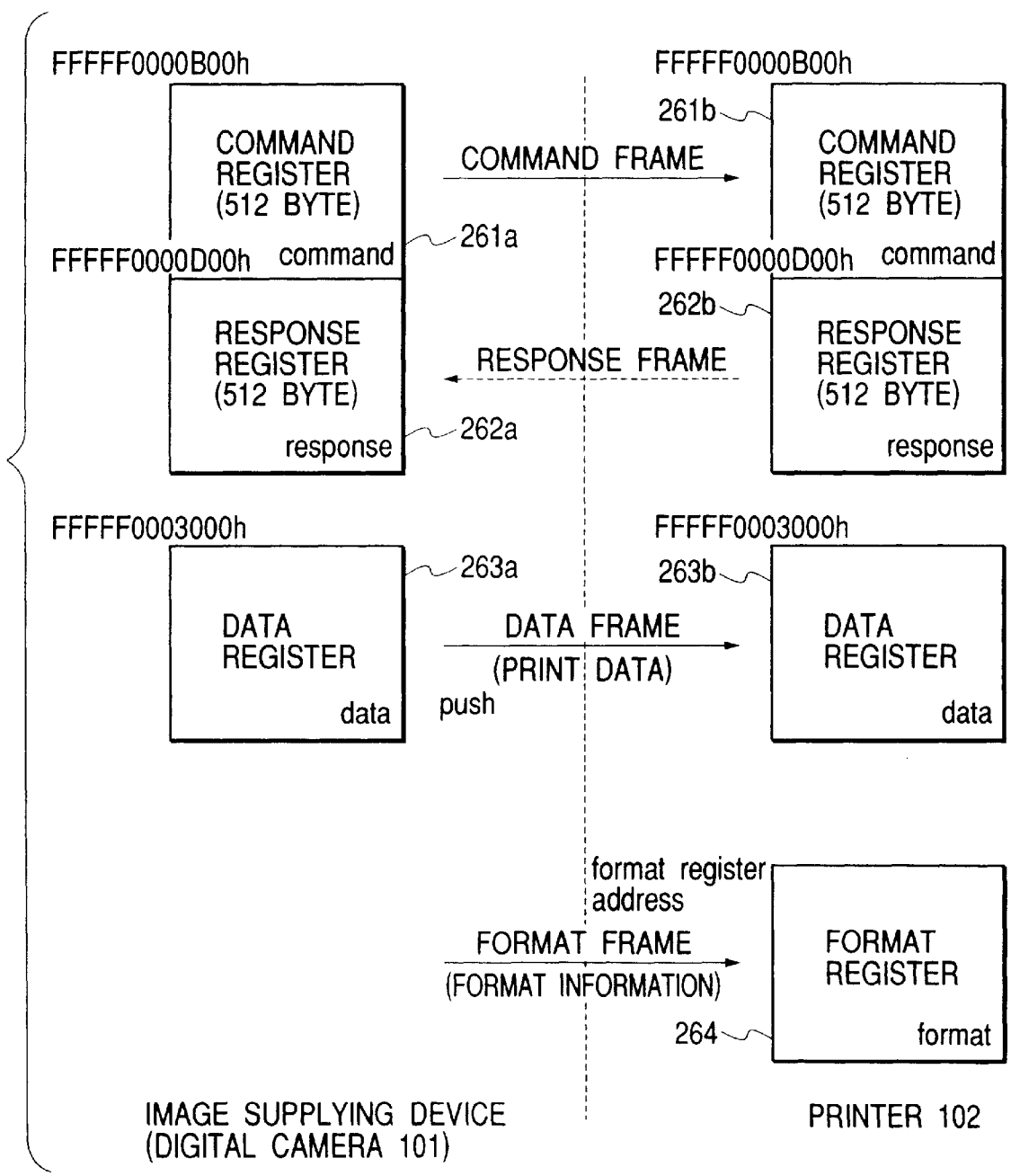
FIG. 9 is a view showing the data flow between the image source device (digital camera) and the printer.

FIG. 9 shows the flow of the aforementioned command frame, response frame, data frame and format frame between the digital camera 101 and the printer 102.

For example, in case of print output of the data in the digital camera 101 by the printer 102, at first the digital camera writes, as shown in FIG. 9, a command to the printer 102 as the command frame in the command register 261$b$ at the side of the printer 102.

Then the printer 102 writes a response, to the command frame written in the command register 261$b$ by the digital camera 101, as the response frame into the response register 262$a$ at the side of the digital camera 101.

The response frame in this state includes information indicating whether the operation, responding to the command frame written by the digital camera 101 into the command register 261$b$ of the printer 102, has been properly executed or a response value to such command.

Then the digital camera 101 writes the data (such as photographed image) to be printed by the printer 102, as the data frame, into the data register 263$b$ at the side of the printer 102.

Also the digital camera 101 writes the format information of the print output by the printer 102, as the format frame, into the format register 264 at the side of the printer 102.

The command frame, response frame and data frame mentioned above can be exemplified for example by commands and responses 271 to 291 and commands 292 to 294 shown in FIG. 10.

As an example, as shown in FIG. 10, the command frame and the data frame can be classified into eight categories (hereinafter called command classification), namely "status" relating to the status "control" for printer control, "block/buffer" for data transfer setting, "channel" for channel setting, "transfer" relating to the transfer method, "format" relating to the format setting, "login" relating to the log-in, and "data" relating to the data transfer.

The command frame and the response frame belonging to a command classification "status" include a command "GetStatus" for acquiring the status of the printer and a response "GetstatusResponse" thereto (271).

The command frame and the response frame belonging to a command classification "control" include a command "PrintReset" for resetting the printer and a response "PrintResetResponse" thereto (272), a command "PrintStart" for starting the printing and a response "PrintStartResponse" thereto (273), a command "PrintStop" for interrupting the printing and a response "PrintStopResponse" thereto (274), a command "InsertPaper" for instructing paper feeding and a response "InsertPaperResponse" thereto (275), a command "EjectPaper" for instructing paper discharge and a response "EjectPaperResponse" thereto (276), a command "CopyStart" for starting the copying of the image data and a response "CopyStartResponse" thereto (277), and a command "CopyEnd" for ending the copying of the image data and a response "CopyEndResponse" thereto (278).

The command frame and the response frame belonging to a command classification "block/buffer" includes a command "BlockSize" designating the block size and a response "BlockSizeResponse" thereto (279), a command "BlockAddress" for designating the block address and a response "BlockAddressResponse" thereto (280), commands "FreeBlock" and "WriteBlock" for acquiring the number of the empty blocks and responses "FreeBlockResponse" and "WriteBlockResponse" thereto (281, 282), a command "BufferConfig" for designating the buffer information and a response "BufferConfiglockResponse" thereto (283), and a command "SetBuffer" for designating the start of data acquisition from the buffer and a response "SetBufferResponse" thereto (284).

The command frame and the response frame belonging to a command classification "channel" include a command "OpenChannel" for opening the channel and a response "OpenChannelResponse" thereto (285), and a command "CloseChannel" for closing the channel and a response "CloseChannelResponse" thereto (286).

The command frame and the response frame belonging to a command classification "transfer" include a command "TransferMethod" for designating the data transfer method and a response "TransferMethodResponse" thereto (287).

The command frame and the response frame belonging to a command classification "format" include a command "SetFormat" for setting the format and a response "SetFormatResponse" thereto (288).

The command frame and the response frame belonging to a command classification "login" include a command "Login" for login and a response "LoginResponse" thereto (289), a command "Logout" for logout and a response "LogoutResponse" thereto (290), and a command "Reconnect" for reconnection and a response "ReconnectResponse" thereto (291).

In response to the writing of values corresponding to the above-described commands 271 to 291 by the digital camera 101 into the command register 261$b$ of the printer 102 as shown in FIG. 9, the printer 102 executes the operations corresponding to such commands.

Then the printer 102 writes the responses to the commands (namely values equivalent to the values corresponding to the commands) in the response register 262$a$ of the digital camera 101 as shown in FIG. 9, whereby the digital camera 101 recognizes the result of execution of each command.

Also the data frame belonging to a command classification "data" includes commands "WriteBlock" and "WriteBuffer" for data writing (292, 293) and a command "PullBuffer" for reading data (294).

The data frame belonging to the command classification "data" do not have a response.

Figure 11:
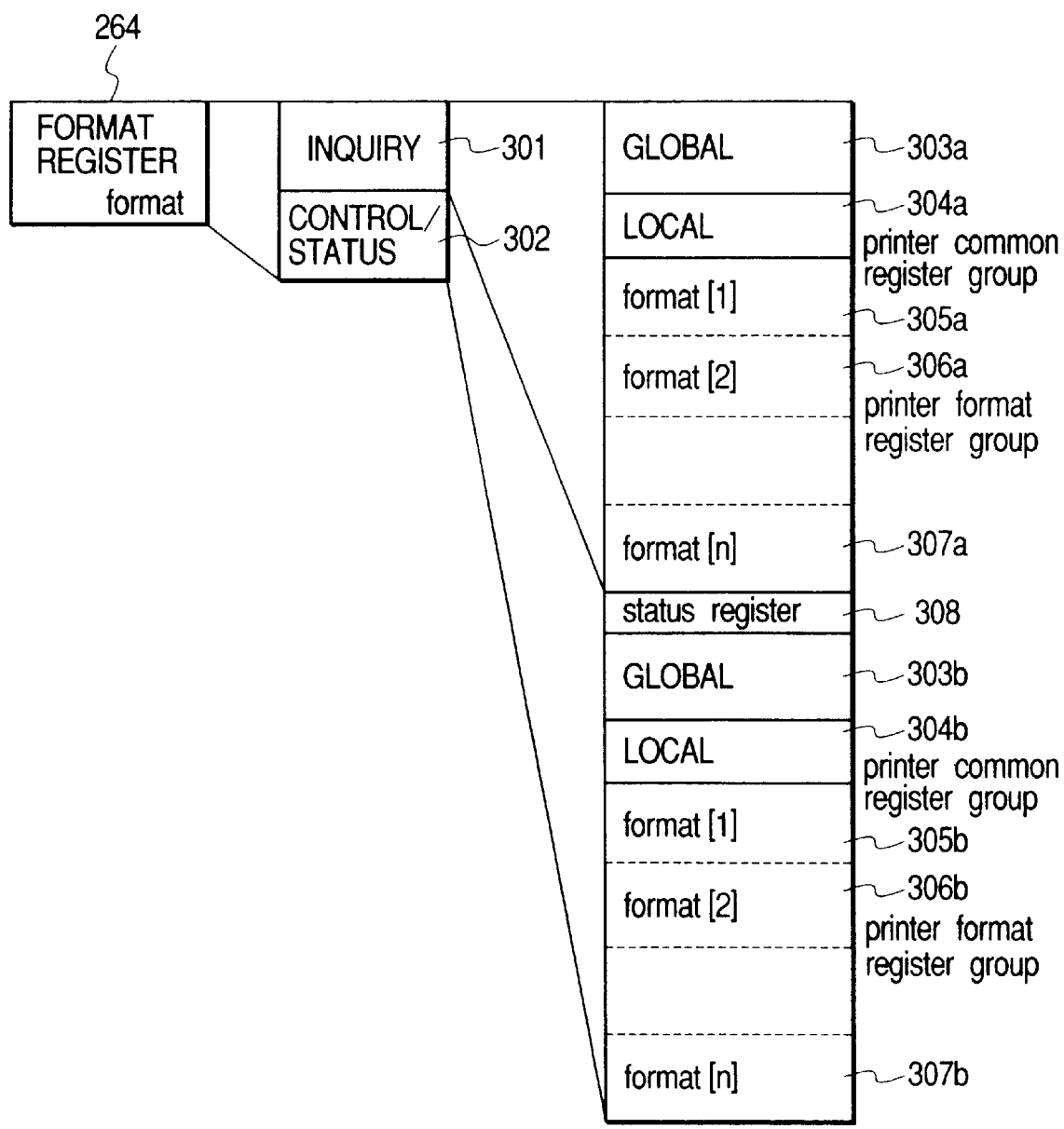
FIG. 11 is a view showing a format register in the above-mentioned printer.

FIG. 11 shows the specific structure of the format register 264 at the side of the printer 102, shown in FIG. 9.

As shown in FIG. 11, the format register 264 includes a register (INQUIRY) 301 exclusive for reading for inquiry, and a read/write register (CONTROL/STATUS) 302 for setting and information acquisition.

The read-only register (INQUIRY) 301 and the read/write register (CONTROL/STATUS) 302 are respectively composed of a group of registers of similar configurations.

More specifically, the read-only register (INQUIRY) 301 is composed of registers 303a to 307a, while the read/write register (CONTROL/STATUS) 302 is composed of a register 308 and registers 303b to 307b similar to those 303a to 307a.

The registers 303a, 304a (303b, 304b) constitute a common register group (printcommonregistergroup), and registers 305a to 307a (305b to 307b) constitute a printer format register group (printformatregistergroup).

The common register group 303a, 304a (303b, 304b) stores information common to all the data formats.

In the common register group 303a, 304a (303b, 304b), the register 303a (303b) is a register (GLOBAL) to all the printers, while the register 304a (304b) is a register (LOCAL) specific to the printer 102.

The printer format register group 305a to 307a (305b to 307b) stores information specific to each data format.

The printer format register group 305a to 307a (305b to 307b) is composed of n registers (format[1] to format[n]) in total, from the register 305a (305b) to the register 307a (307b).

The registers 305a to 307a (305b to 307b) respectively correspond to the data formats to be explained later, and a printer format register group 305a to 307a (305b to 307b) is assigned to each loaded data format.

Also the addresses of the printer format registers 305a to 307a (305b to 307b) are given to the digital camera 101 as the response to a command for setting the data format.

Figure 12:
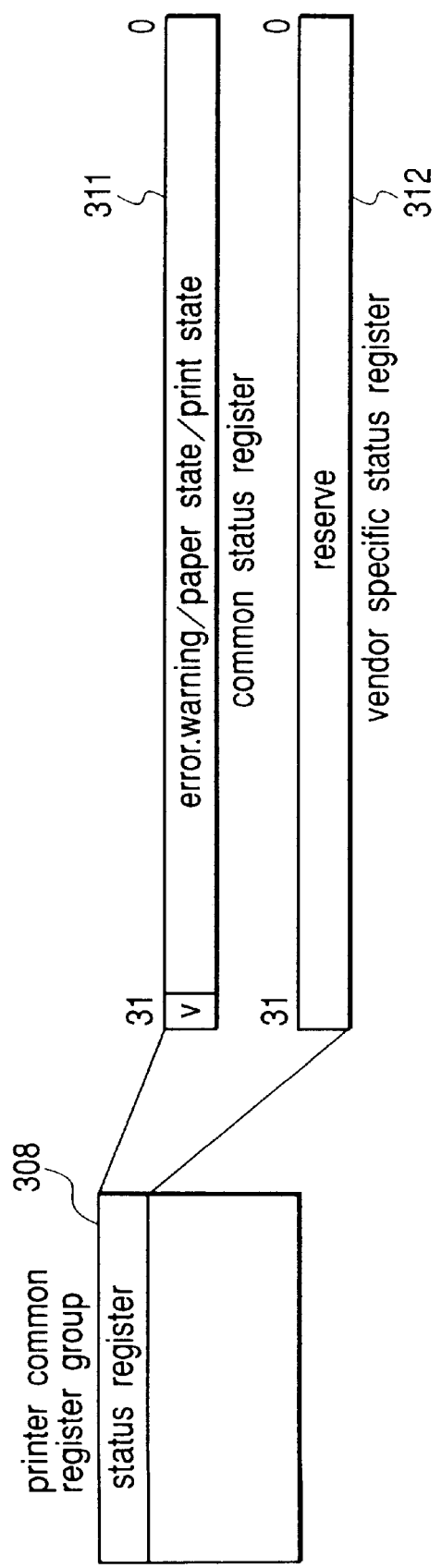
FIG. 12 is a view showing a read/write register (CONTROL/STATUS) in the above-mentioned format register.

FIG. 12 shows the detailed structure of the register 308 of the read/write register (CONTROL/STATUS) 302 shown in FIG. 11.

The register 308 is composed of a common status register (commonstatusregister) 311 and a vendor specific status register (vendorspecificstatusregister) 312 of 32 bits each.

The common status register 311 holds status common to the printer of various vendors, while the vendor specific status register 312 hold the status defined specifically for each vendor.

In the common status register 311, a V-flag to be explained later defines expansion to the vendor specific status register 312.

The above-mentioned V-flag defines expansion to the specific status register 312 by the following information ("0", "1", "error", "warning" etc.):

0: not available; 1: available; error.warning: error, warning status; paperstate: paper condition; printstate: printer condition on the printer 102.

Figure 13:
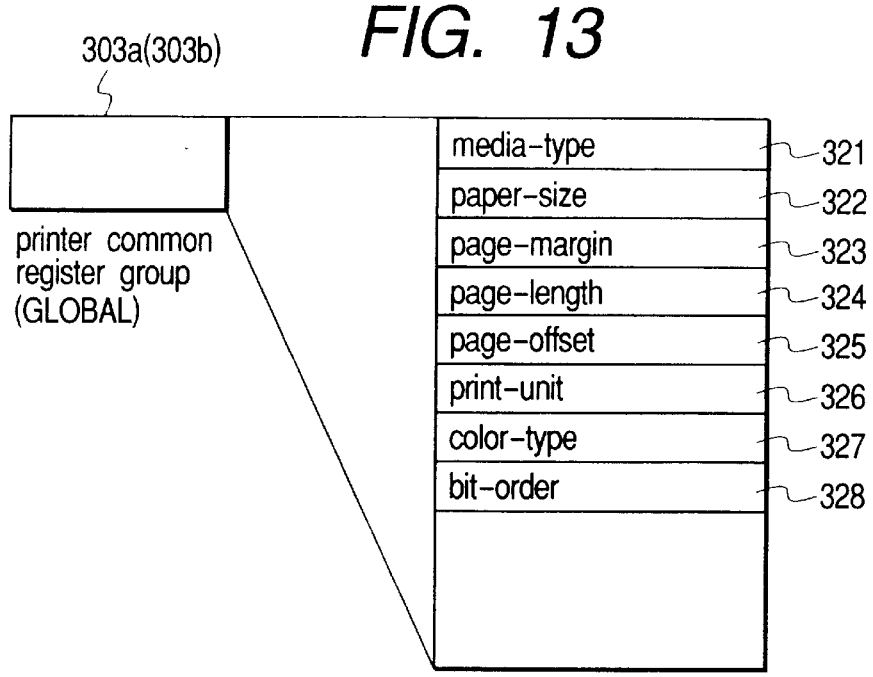
FIG. 13 is a view showing a common register group (GLOBAL) in the above-mentioned format register.

FIG. 13 shows the detailed structure of the register 303a (303b) of the common register group 303a, 304a (303b, 304b) shown in FIG. 11.

The register 303a (303b) holds information common to all the printers (including the printer 102) loaded with the direct print protocol.

Stated differently, there is held common information which is not different by the kind of the printer.

For example, the register 303a (303b) includes an area (media-type) 321 for holding information indicating the kind of the print medium; an area (paper-size) 322 for holding information indicating the size of paper; an area (paper-margin) 323 for holding information indicating margin values of a page; an area (page-length) 324 for holding information indicating the length of a page; an area (page-offset) 325 for holding information indicating the offset of a page; an area (print-unit) 326 for holding information indicating the unit information of the printer, an area (color-type) 327 for holding information indicating the type of colors of the printer; and an area (bit-order) 328 for holding information indicating the bit order of the data.

Figure 14:
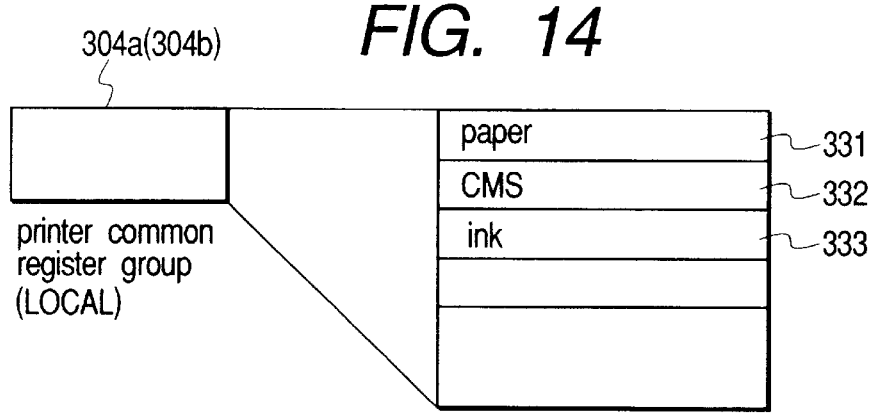
FIG. 14 is a view showing a common register group (LOCAL) in the above-mentioned format register.

FIG. 14 shows the detailed structure of the register 304a (304b) in the common register group 303a, 304a (303b, 304b) shown in FIG. 11.

The register 304a (304b) holds information specific to each type of the printer (including the printer 102) loaded with the direct print protocol.

The register 304a (304b) for example includes an area (paper) 331 for holding information indicating the kind of the print medium specific to the print; an area (CMS) 332 for holding information indicating the color matching method; and an area (ink) 333 for holding information indicating the kind of inks of the ink jet printer.

Figure 15:
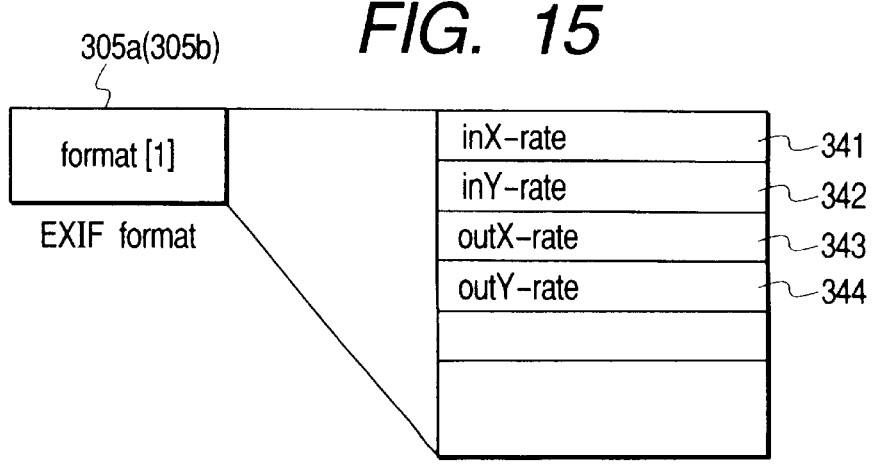
FIG. 15 is a view showing a printer format register group (format [1]) in the above-mentioned format register.

FIG. 15 shows the detailed structure of the register 305a (305b) in the printer format register group 305a to 307a (305b 307b) shown in FIG. 11.

The register 305a (305b) holds format information for example for the EXIF (exchangeable image file format) which is one of the image data formats.

In this case, the register 305a (305b) includes an area (inX-rate) 341 for holding information on the input rate in the X-direction, an area (inY-rate) 342 for holding information on the input rate in the Y-direction, an area (utX-rate) 343 for holding information on the output rate in the X-direction, and an area (utY-rate) 344 for holding information on the output rate in the Y-direction.

The printer 102 is rendered capable of print output by modifying the magnification in the X and Y directions according to the content of the image data of the EXIF format given by the register 305a (305b).

Figures 16, 17:
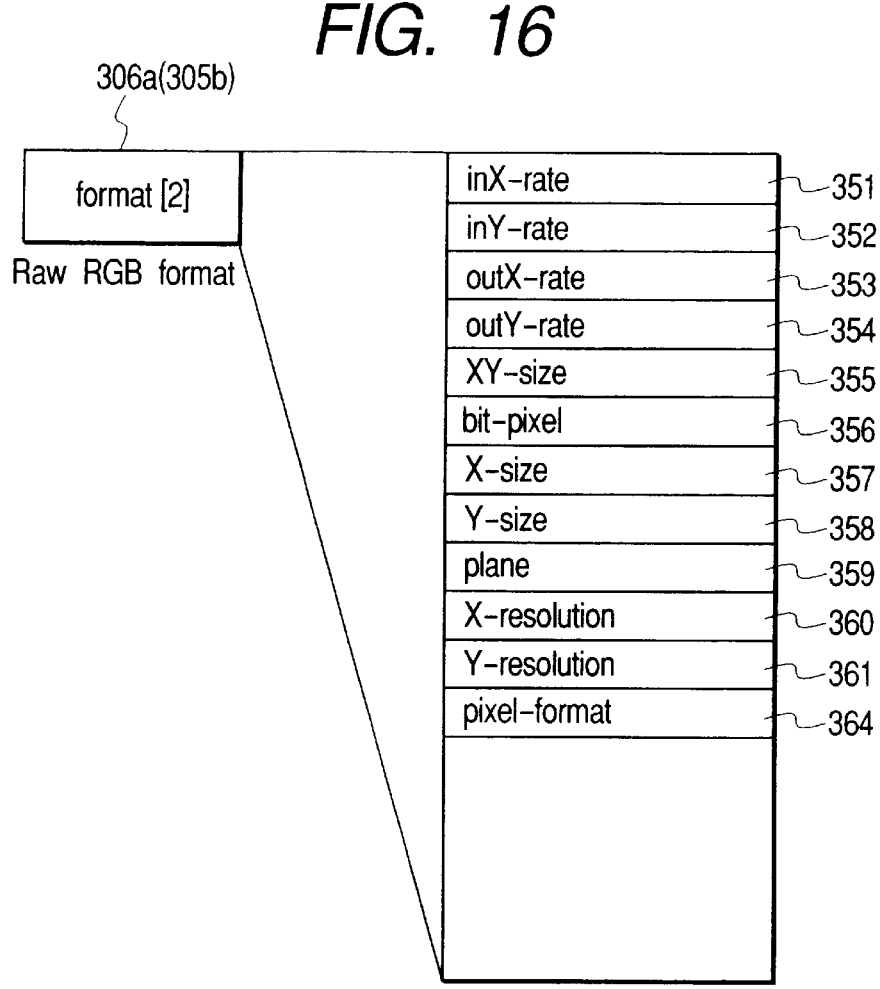
FIG. 16 is a view showing a printer format register group (format [2]) in the above-mentioned format register.
FIG. 17 is a view showing an example of the format supportable in the above-mentioned printer.

FIG. 16 shows the detailed structure of the register 306a (306b) in the printer format register group 305a to 307a (305b 307b) shown in FIG. 11.

The register 306a (306b) holds format information for example for the "raw RGB format" (hereinafter simply called "RGB format" in which each pixel is composed of R (red), G (green) and B (blue) data.

In this case, the register 306a (306b) includes an area (inX-rate) 351 for holding information on the input rate in the X-direction, an area (inY-rate) 352 for holding information on the input rate in the Y-direction, an area (utX-rate) 353 for holding information on the output rate in the X-direction, an area (utY-rate) 354 for holding information on the output rate in the Y-direction, an area (XY-size) 355 for holding information indicating the XY-fixed pixel size, an area (bit-pixel) 356 for holding information indicating the bit number per pixel, an area (X-size) 357 for holding information indicating the number of pixels in the X-direction, an area (Y-size) 358 for holding information indicating the number of pixels in the Y-direction, an area (plane) 359 for holding information indicating the color planes per pixel, an area (X-resolution) 360 for holding information indicating the resolution in the X-direction, an area (Y-resolution) 361 for holding information indicating the resolution in the Y-direction, and an area (pixel-format) 362 for holding information indicating the kind of the pixel.

The printer 102 is rendered capable of print output with modification of magnification in the X and Y directions, conversion of resolution, change of pixel change etc. according to the content of the image data of the RGB format given by the register 306a (306b).

Figure 18:
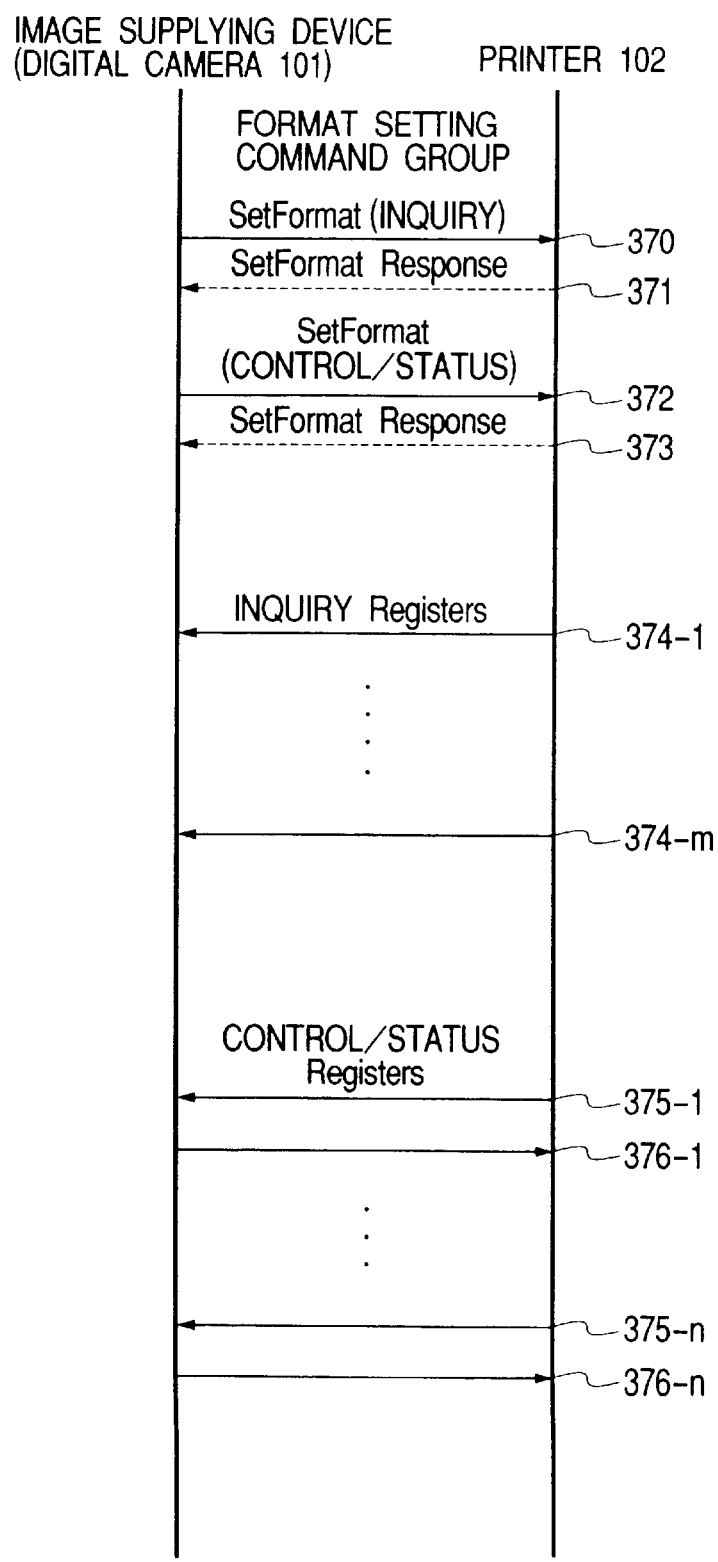
FIG. 18 is a view showing a format setting process in the above-mentioned printer.

In the printer format register group 305a to 307a (305b to 307b), those succeeding to the register 306a (306b) also hold various format information as in the aforementioned registers 305a, 306a (305b, 306b), and FIG. 18 shows examples of the image data format supported by the direct print printer.

In the present embodiment, the printer 102 supports data according to any of the various formats shown in FIG. 17.

However, the image data format supported by the direct print system is not limited to those shown in FIG. 17, and there may be optionally supported other formats.

FIG. 18 shows a format setting sequence for the printer 102.

At first the digital camera 101 writes a command "SetFormat" (cf. FIG. 10) for inquiry as a command frame in the command register 261b (cf. FIG. 9) of the printer 102 (step S370).

Then the printer 102 writes a response "SetFormatResponse" (cf. FIG. 10) in the response register 262a of the digital camera 101 (step S371).

Thus the digital camera 101 recognizes the address of the read-only register (inquiry) 301 (cf. FIG. 11) of the format register 264 of the printer 102.

Then the digital camera 101 writes a command "SetFormat" for control/status (cf. FIG. 10) as a command frame in the command register 261b (cf. FIG. 9) of the printer 102 (step S372).

Then the printer 102 writes a response "SetFormatResponse" (cf. FIG. 10) in the response register 262a of the digital camera 101 (step S373).

Thus the digital camera 101 recognizes the address of the read/write register (control/status) 302 succeeding to the read-only register (inquiry) register 301 in the format register 264 of the printer 102.

Then the digital camera 101 recognizes the set items of the format supported by the printer 102 from the content of the read-only register (inquiry) 301 of the format register 264 of the printer 102, based on the address thereof recognized from the response from the printer 102 in the step S371 (steps S371-1 to S374-m).

More specifically, the digital camera 101 reads in succession the contents of the printer format register group 305a to 307a of the read-only register (inquiry) 301, thereby recognizing the set items of the format supported by the printer 102.

Then the digital camera 101 reads the contents of the printer format register group 305b to 307b of the read/write register (control/status) of the format register 264 of the printer 102 (steps S375-1 to S375-n) and writes the information of the desired format into these registers (steps S376-1 to S376-n).

PULLtype Data Transfer

The communication system 100 of the present embodiment shown in FIG. 1 employs pull-type data transfer method in case the printer 102 reads the data from the memory in the digital camera 101.

Figure 19:
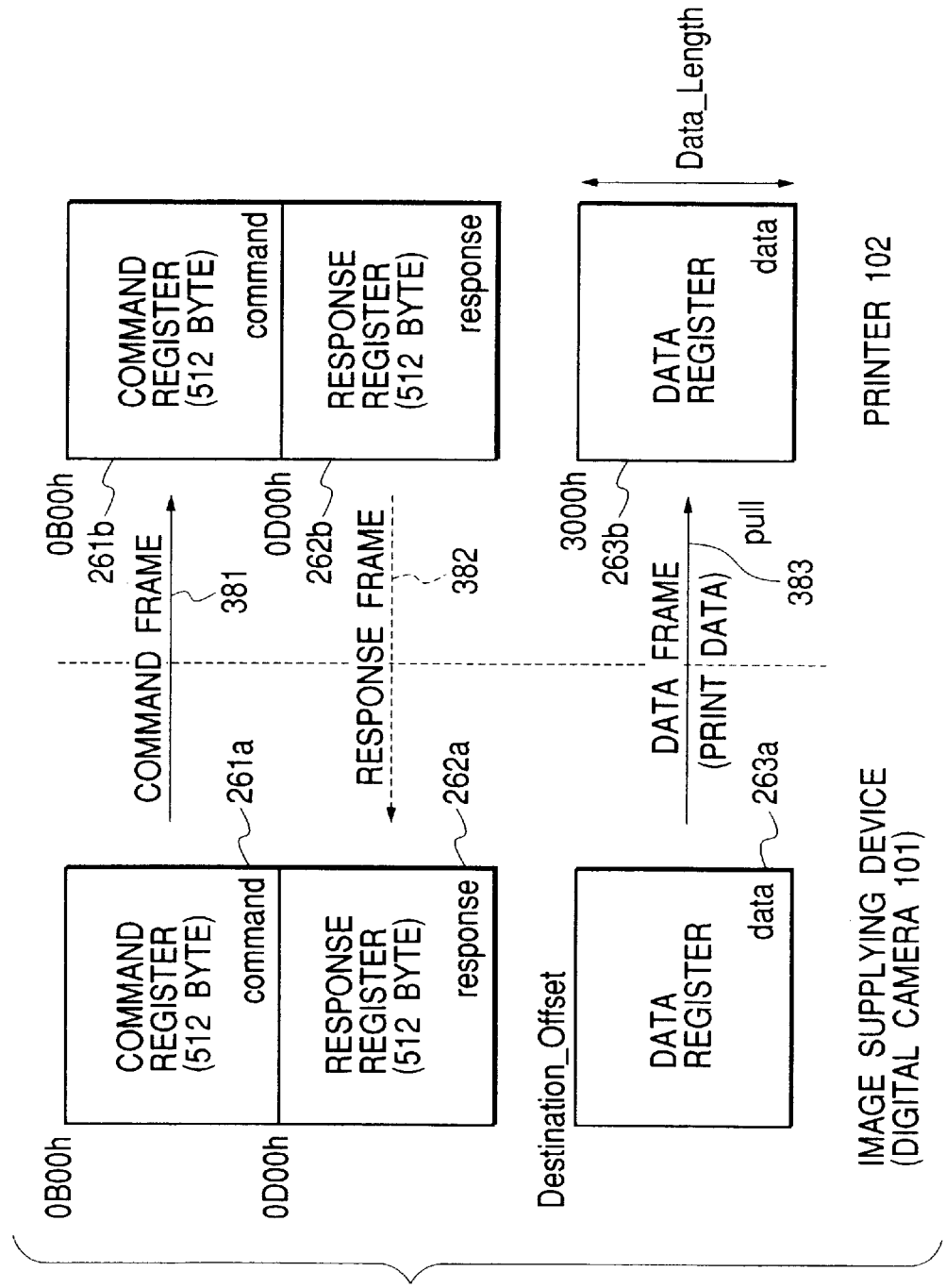
FIG. 19 is a view showing the data flow (data flow by PULL-type data transfer method) between the image source device (digital camera) and the printer.

In the pull-type data transfer method, the output operations of command and response between the digital camera 101 and the printer 102 are based on FCP, and are executed, as shown in FIG. 19, by a writing operation of the digital camera 101 for a command frame 381 into the command register 261b of the printer 102 and a writing operation of the printer 102 for a response frame 382 into the response register 262a of the digital camera 101.

On the other hand, the writing operation of a data frame 383 is different from the writing operation of the command frame 381 or of the response frame 382 (namely different from the FCP-based operation) and is executed by a unidirectional operation in which the printer 102 reads the content (image data) of the data register 263a of the digital camera 101 as a data frame 383 into the data register 263b of the printer 102, utilizing the read transaction.

Figure 20:
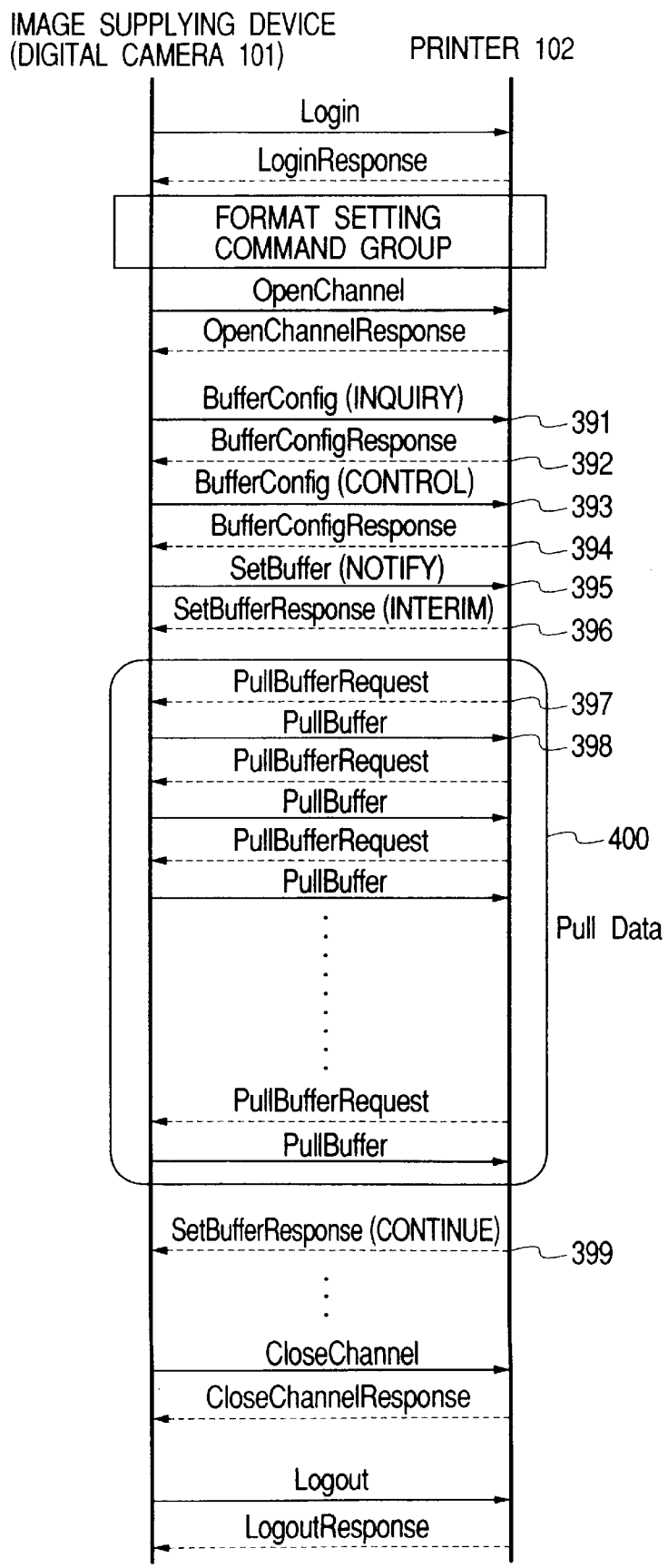
FIG. 20 is a view showing the functions of command and response (function by PULL-type data transfer method) between the image source device (digital camera) and the printer.

FIG. 20 shows the operations according to the above-described pull-type data transfer method, when the digital camera 101 and the printer 102 executes data transfer based on DPP.

In the following description, the operations of command and response for format setting are similar to those explained in the foregoing with reference to FIG. 18, while those for "Login", "Logout", "OpenChannel" and "CloseChannel" and those for "BufferConfig" and "SetBuffer" are similar to those in the aforementioned pull-type data transfer method, so that these operations will not be explained further in detail.

At first the digital camera 101 writes, in the command register 261b of the printer 102, a "BufferConfig" command for inquiring information on the buffer area of the printer 102 (buffer size, buffer address etc.) as a command frame (step S391).

Then the printer 102 writes a response to the "BufferConfig" written into the command register 261b, as a response frame, in the response register 262a of the digital camera 101 (step S392).

Thus the digital camera 101 recognizes the information (buffer size, buffer address etc.) of the buffer area of the printer 102.

Then the digital camera 101 writes a "BufferConfig" command for setting the buffer size and the buffer address to be read by the printer 102 from the digital camera 101, as a command frame, in the command register 261b of the printer 102 (step S393).

Then the printer 102 writes a response to the "BufferConfig" written into the command register 261b, as a response frame, in the response register 262a of the digital camera 101 (step S394).

Thus the digital camera 101 recognizes the completion in the printer 102 of the buffer size and the buffer address to be read from the digital camera 101 to the printer 102.

Then the digital camera 101 writes a "SetBuffer" command as a command frame in the command register 261b of the printer 102, thereby informing the printer 102 that the data transfer can be initiated (step S395).

Then the printer 102 writes a response to the "SetBuffer" written into the command register 261b, as a response frame, in the response register 262a of the digital camera 101 (step S396).

Thus the digital camera 101 recognizes that the preparation of the printer 102 for data fetching is completed.

Thereafter the digital camera 101 starts data transfer to the printer 102.

More specifically, the digital camera 101 and the printer 102 execute data transfer utilizing the respective data registers 263a, 263b, through a step S397 in which the printer 102 at first issues a "PullBuffer" request (a request packet by read transaction) and a step S398 in which the digital camera 101 issues, to the printer 102, a response packet to the request.

Thus there is executed data transfer (in the pull-type data transfer method) to the buffer address informed from the digital camera 101 to the printer 102.

The above-described data transfer operation is repeated (step S400), and, when the printer 102 writes a "SetBuffer" response as a response frame in the response register 262a of the digital camera 101 (step S399), the digital camera 101 recognizes that all the data have been transferred to the printer 102.

Figure 21:
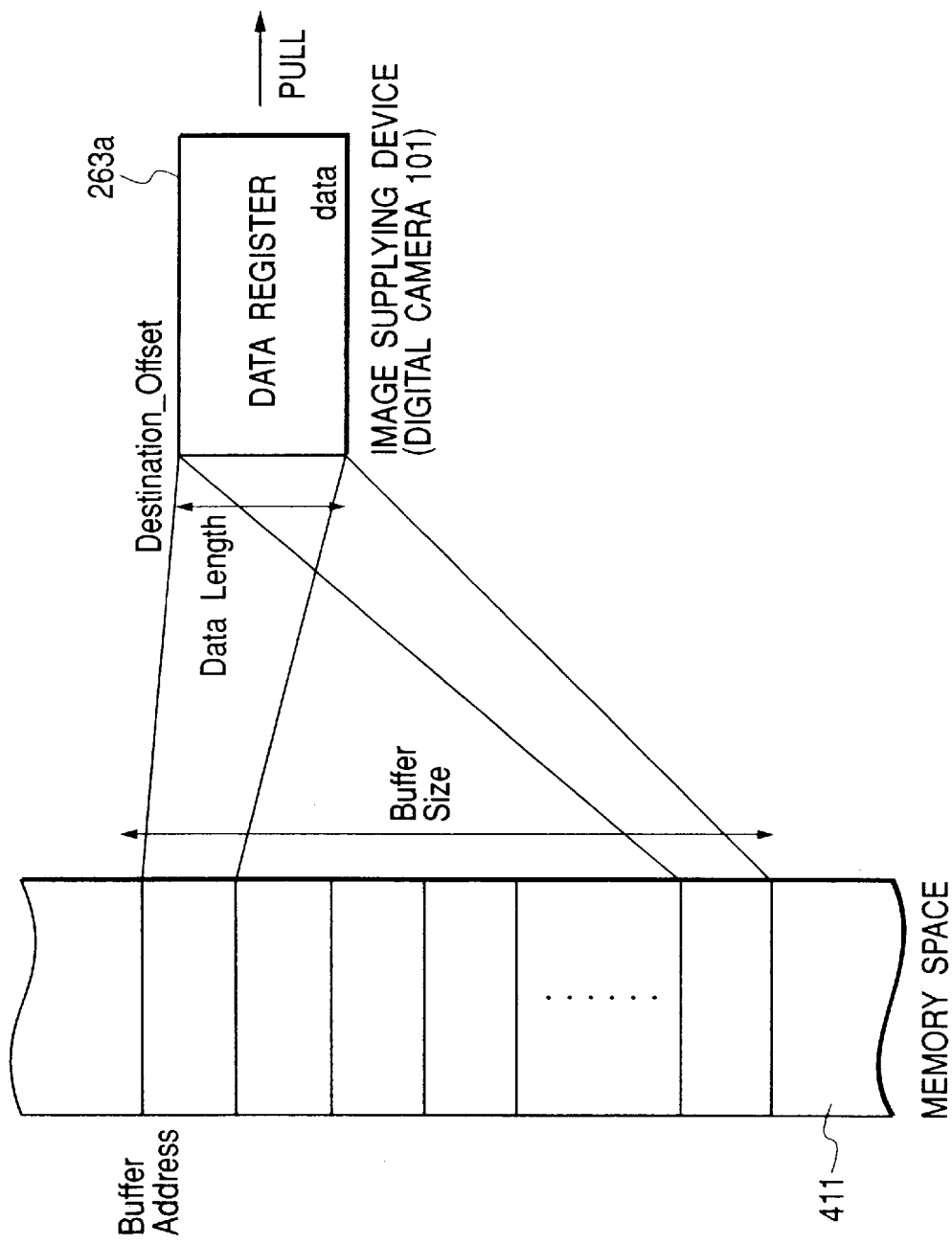
FIG. 21 is a view showing the relationship between a data register of the image source device (digital camera) and a buffer thereof.

FIG. 21 shows the relationship between the data register 263a of the digital camera 101 and a buffer 411 thereof.

As shown in FIG. 21, the reading start address "BufferAddress" of the buffer 411 is determined according to a value "Destination_Offset" set by the data register 263a, and the data of an area indicated by such reading start address "BufferAddress" are read by the read transaction.

The "Destination_Offset" value is every time increased by the "DataLength" of the data register 263a.

The data in the buffer 411 can be read in continuous manner by repeating the data reading for the continuous address of the buffer 411 according to such "Destination_Offset" value.

The data held in the buffer 411 of the digital camera 101 can thus be transferred to the printer 102 in the above-explained manner.

Such data transfer based on the pull-type data transfer method allows the printer 102 to read the data written in the buffer 411 of the digital camera 101 by direct address designation.

File Configuration of Image Data

The buffer 411 shown in FIG. 21 (in the digital camera 101) holds the image data, such as the image photographed by the digital camera 101.

Such image data are constructed as an image file of the following file format.

In the present embodiment, the digital camera 101 informs the printer of the format information (buffer address, buffer size etc.) of the buffer 411 holding the image data, so that the printer 102 is rendered capable of fetching the image data under arbitrary selection from the buffer 411 in the following manner.

In the present embodiment, the EXIF file format is employed as an example of the file format, but such example is not restrictive and the present embodiment is naturally applicable similarly to any file format including a thumbnail image.

Figure 22:
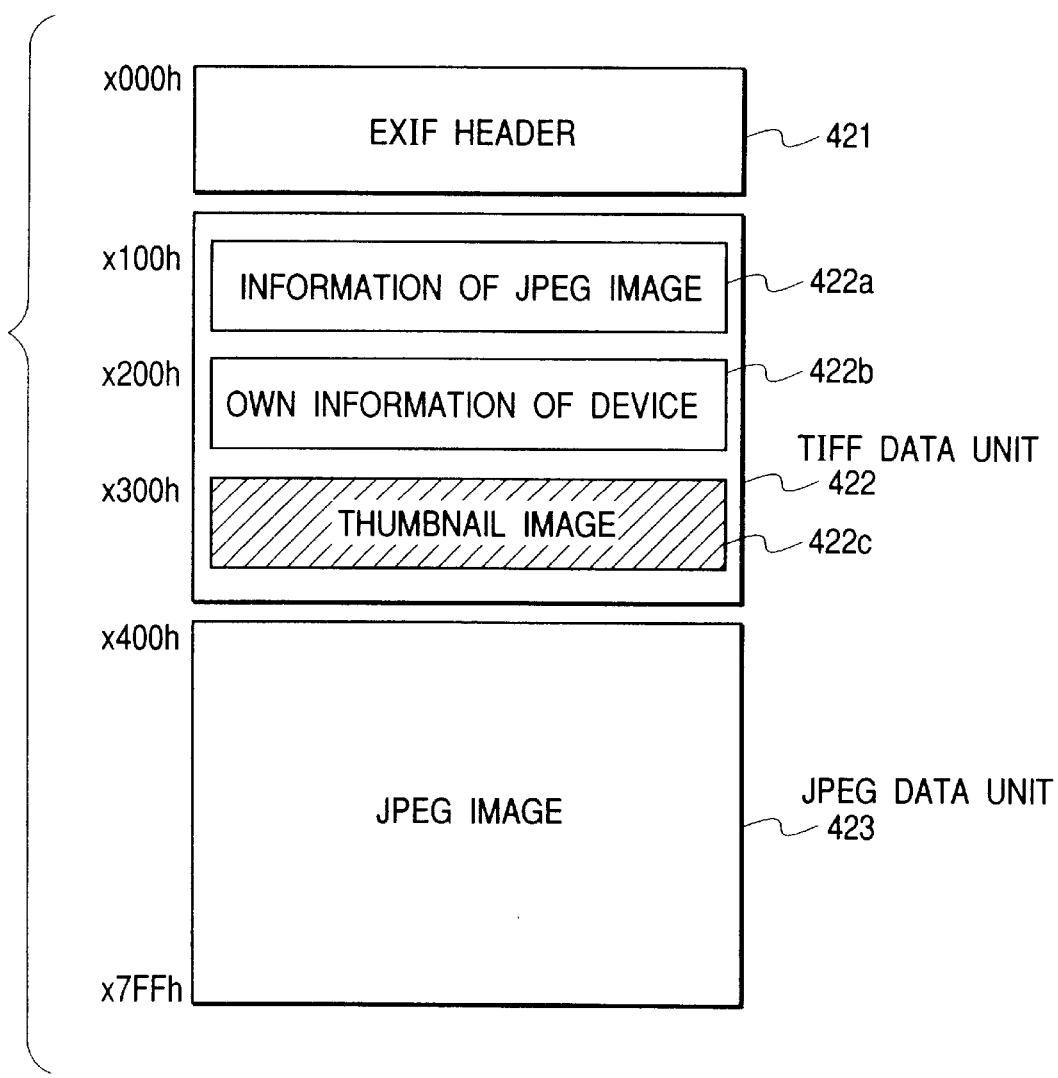
FIG. 22 is a view showing the configuration of an image file held in the above-mentioned buffer.

FIG. 22 shows the configuration of an image file of the EXIF file format.

The image file is composed of an EXIF header (421), a TIFF data portion (422) and a JPEG data portion (423).

The TIFF data portion 421 includes an area 422a for holding the JPEG image information (hereinafter called "JPEG image area"), an area 422b for holding information specific to the digital camera 101 (hereinafter called "digital camera information area"), and an area 422c for holding information of the thumbnail image information (hereinafter called "thumbnail image area").

The JPEG image area 422a stores information including image information compressed by the JPEG method from the actual image obtained by photographing.

The above-mentioned image file of the EXIF file format is featured by a fact that the entire file appears as a file of the JPEG format.

FIGS. 23 and 24 show the detailed structure of the EXIF header 421 and the TIFF data portion 422 shown in FIG. 22.

For example, in case of obtaining the data on the photographing date and time and the thumbnail image from the information stored in the JPEG image area 422a and the digital camera information area 422b, reference is at first made to the EXIF header 421 starting from an address "×000"h of the image file. The EXIF header 421 stores the start address of the TIFF data portion 422 and the size of the entire image file.

Based on the start address "0100"h of the TIFF data portion 422 and the size of 1792 bytes of the entire image file, there can be recognized that the TIFF data portion 422 starts from an address "×100"h and that the image file ends at an address "×7FF"h.

Then reference is made to the TIFF data portion 422 starting from an address "×100"h, in which the JPEG image area 422a stores the area information of the specific information.

Based on the initial offset of the specific information is "×100"h in the JPEG image area 422a, there can be recognized that the information specific to the digital camera 101 is stored in an area starting from "×200"h, which is advanced by "×100"h from the start address "×100"h of the TIFF data portion 422.

Stated differently, the actual start address of the digital camera information area 422b can be recognized as "×200"h.

Then reference is made to the digital camera information area 422b, starting from an address "×200"h and storing a tag of the photographing time.

The search of the photographing time tag provides an offset value "×1C4"h, whereby there can be recognized that the information of the photographing date and time by the digital camera 101 is stored in an area starting from an address "×2C4"h, which is advanced by "×1C4"h from the start address "×100"h of the TIFF data portion 422.

Thus, there can be obtained, as the photographing date and time, "Jul. 6, 1997, 12 hours, 36 minutes, 10 seconds".

After the acquisition of the photographing date and time in the above-described manner, reference is then made to the TIFF data portion 422 starting from an address "×100"h for obtaining thumbnail images. Its JPEG image area 422a stores offset information indicating the area of the thumbnail images.

As the offset value indicating the thumbnail image area is "×200"h, there can be recognized that the actual thumbnail image information is stored in an area starting from an address "×300"h, which is advanced by "×200"h from the start address "×100"h of the TIFF data portion 422.

In this manner there can be recognized that the actual start address of the thumbnail image area 422c is "×300"h.

Then reference is made to the thumbnail image area 422c starting from an address "×200"h and storing a thumbnail offset tag.

The search of the thumbnail offset tag provides an offset value "×220"h, whereby there can be recognized that the thumbnail images are stored in an area starting from an address "×320"h, which is advanced by "×220"h from the start address "×100"h of the TIFF data portion 422.

Also reference is made to the thumbnail image area 422c starting from an address "×200"h and storing a thumbnail size tag.

The search of the thumbnail size tag provides a byte number of "4800" bytes, whereby there can be recognized that the thumbnail images are stored with 4800 bytes starting from an address "×320"h.

Thus there can be acquired the thumbnail images of 4800 bytes.

The thumbnail image is assumed to be constituted by a non-compressed image, obtained by reducing the actual image to 80×60 dots according to the TIFF format.

As explained in the foregoing, by referring to the header and various information of the image file, there can be obtained the thumbnail images in such image file and the information on the photographing date and time thereof.

Figure 25:
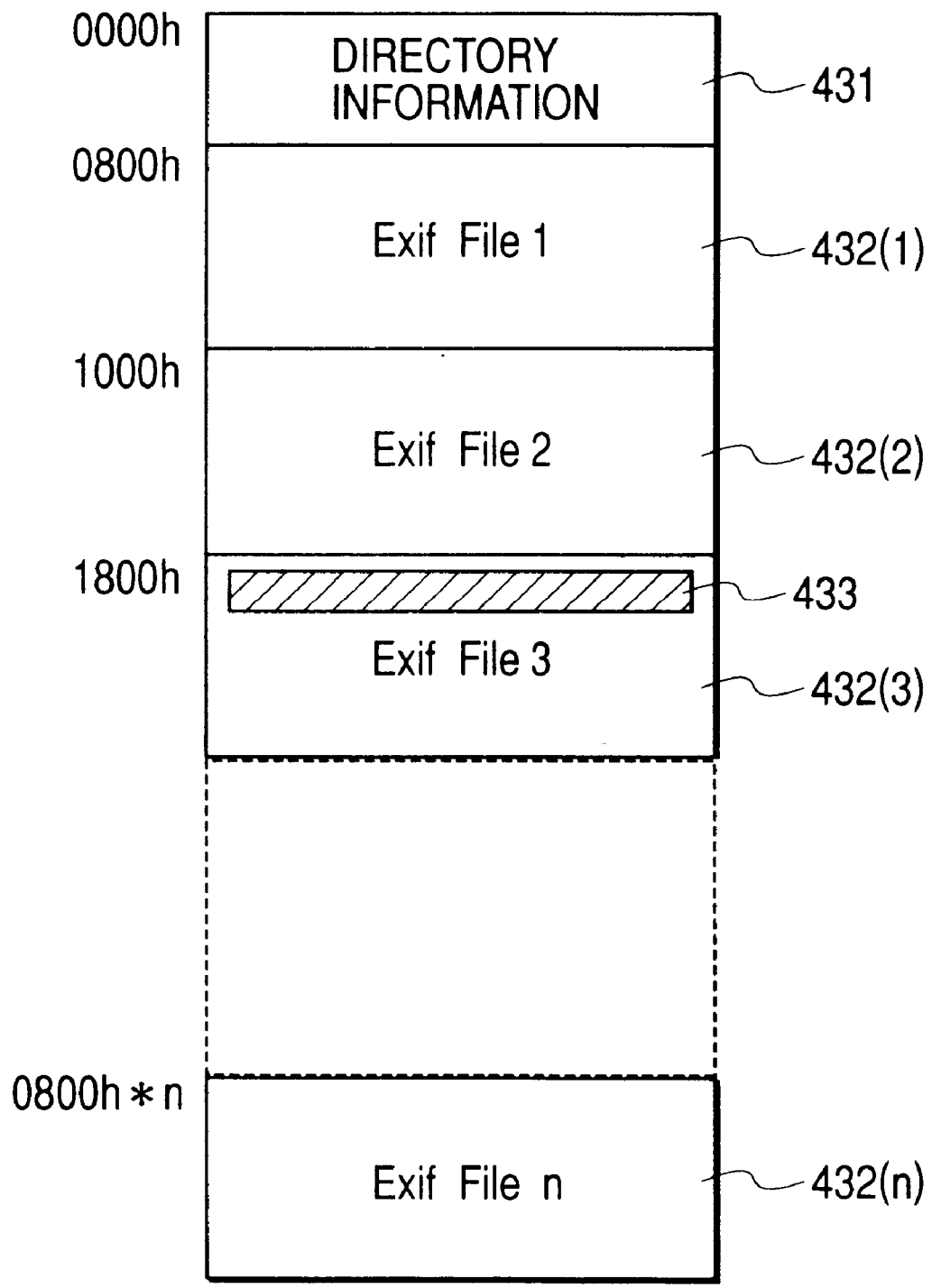
FIG. 25 is a view showing a state in which plural above-mentioned image files are held in the above-mentioned image source device (digital camera)

FIG. 25 is a memory map of a state in which the buffer 411 in the digital camera 101 holds a plurality of the image files as shown in FIG. 22.

In the digital camera 101, succeeding to an area of addresses "0000"h to "07FF"h storing directory information (hereinafter alled "directory area"), there are held plural image files 432(1) to 432(n).

The directory area 431 stores information indicating the start addresses of the image files 432(1) to 432(n) and the sizes thereof.

In extracting a desired image file (for example the image file 432(3)) from the image files 432(1) to 432(n), such image file can be extracted based on the start address 433 of the image file 432(3), obtained from the information of the directory area 431.

More specifically, as an example, there are shown in FIG. 25 the start address "0800"h for the image file 432(1), the start address "1000"h for the image file 432(2), the start address "1800"h for the image file 432(3) etc.

Thus the image files 432(1), 432(2), 432(3), . . . have the start addresses mutually separated by "0800"h, and information (map information) indicating such structure is stored in the directory area 431.

Thus, in order to extract the n-th image file 432(n), the start address can be obtained by n times of "0800"h.

Figure 26:
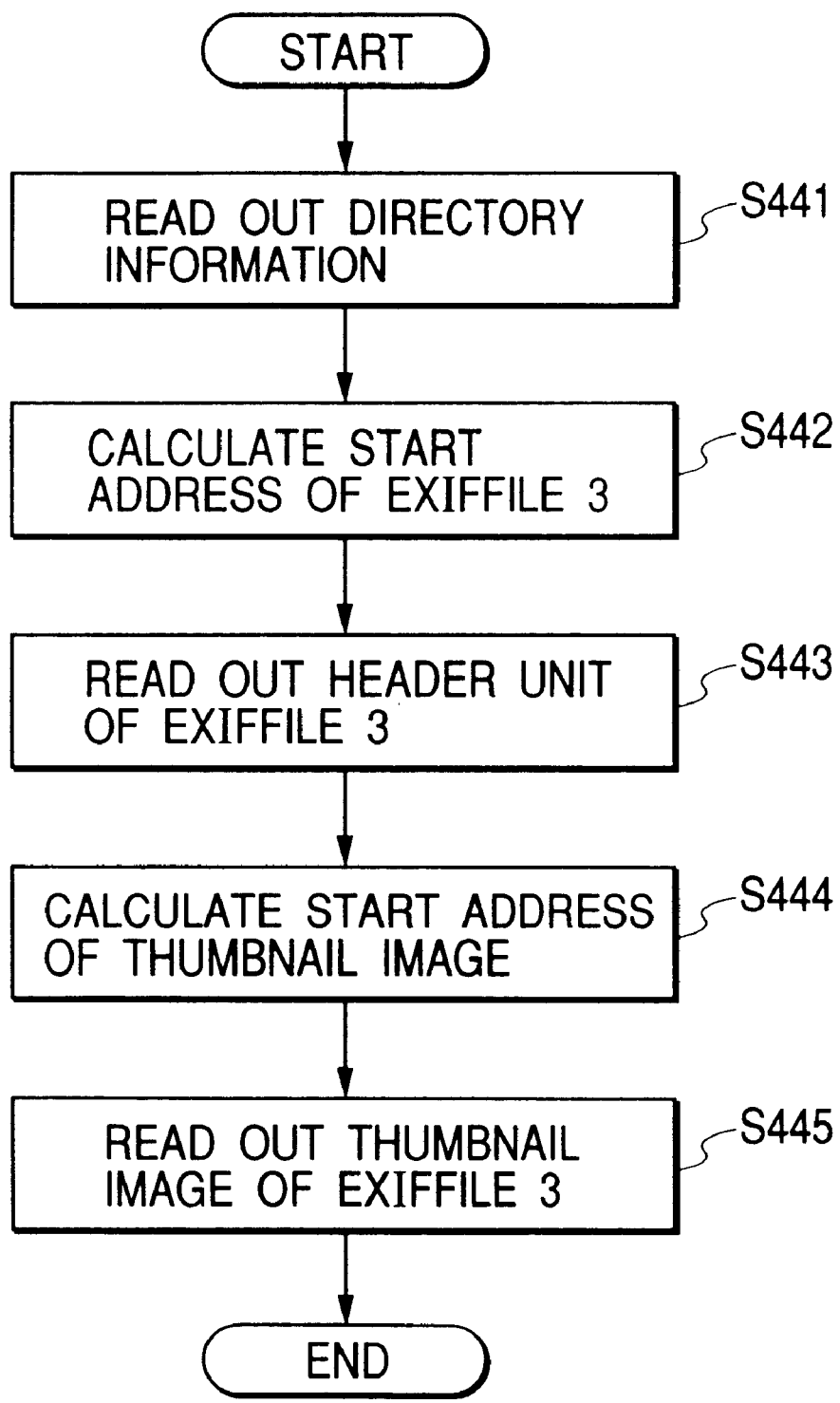
FIG. 26 is a view showing a process for extracting the thumbnail image from the above-mentioned image file.

FIG. 26 shows the operation of reading the arbitrary thumbnail image and the information of the photographing date and time of an arbitrary image file from the plural image files as shown in FIG. 25, held in the memory (buffer 411) of the digital camera 101.

For the purpose of simplicity of explanation, it is assumed that the image file 432(3) is extracted from the image files 432(1) to 432(n).

At first the information is read from the directory area 431 (step S441).

Then, based on the information in the directory area 431, as the desired image file 432(3) is a third image file, the start address of the image file 432(3) "1800"h is calculated by tripling "0800"h (step S442).

Then, based on the start address "1800"h of the image file 432(3), there is read the information (cf. FIG. 23) of the image file 432(3) in the EXIF header 421 (step S443).

Then based on the information in the EXIF header 421, there is calculated the start address of the image file 432(3) in the JPEG image area 422*a*, and, based on the information in the JPEG image area 422*a*, there is calculated the start address of the digital camera information area 422*b* and the thumbnail image area 422*c* (step S444).

Then, based on the information on the start address of the thumbnail image area 422*c*, the thumbnail image in the image file 423(3) is acquired, and, based on the information on the start address of the digital camera information area 422*b*, the information on the photographing date and time is acquired (step S445).

Figure 27:
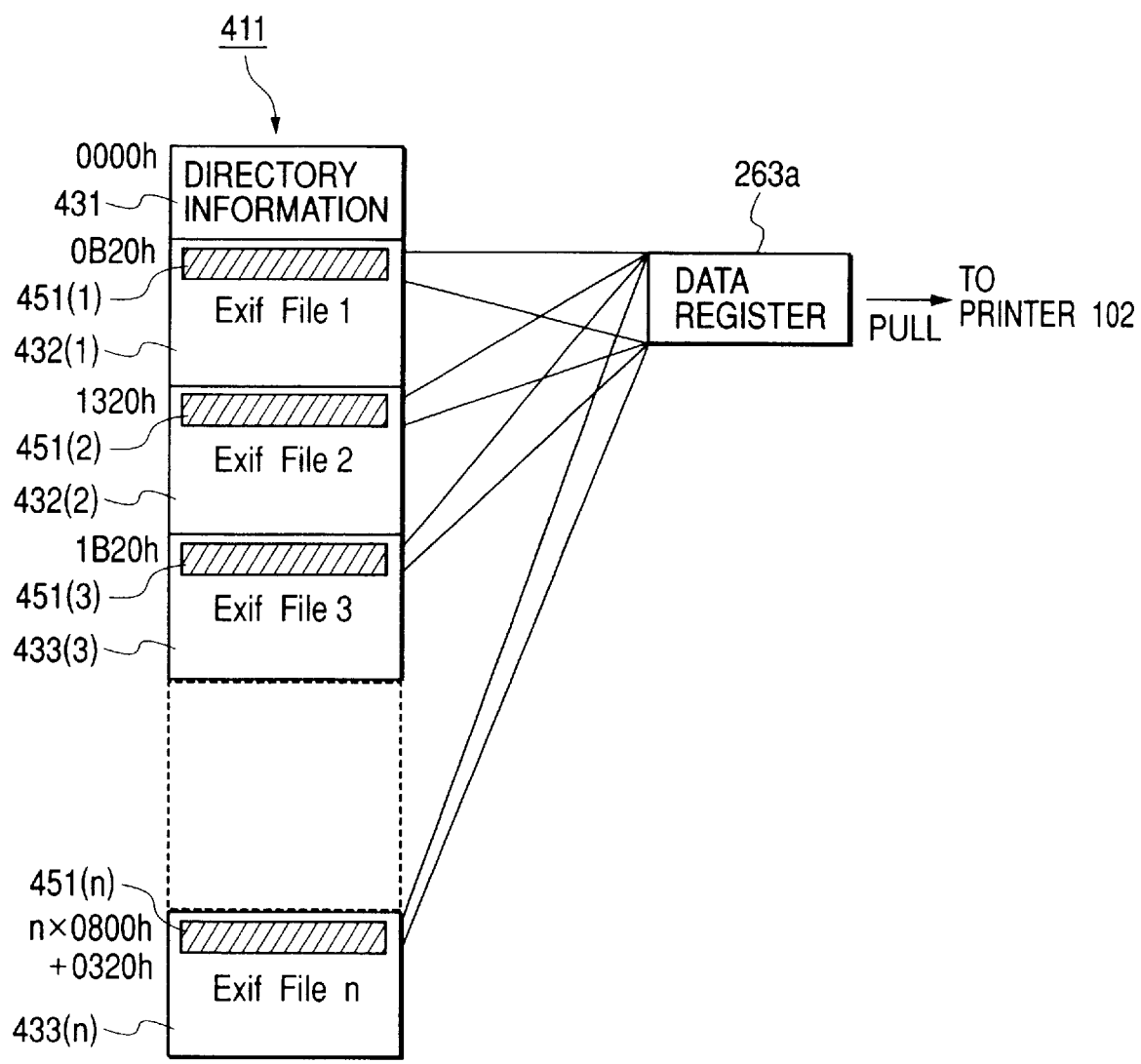
FIG. 27 is a view showing a start address in the above-mentioned thumbnail image extracting process.

FIG. 27 shows the operation of the printer 102 for reading the data of the thumbnail data only from the image file in the buffer 411, based on the address and size of the buffer 411 informed from the digital camera 101.

Referring to FIG. 27, since the start addresses of the thumbnail image data of the plural image files 432(1) to 432(n) are acquired from the information of the directory area 431, there are obtained a start address 451(1) for the image file 432(1) at "0B20"h, a start address 451 (2) for the image file 432 (2) at "1320"h, a start address 451(3) for the image file 432(3) at "1B20"h etc.

Thus the start address 451(n) of the n-th image file 432(n) can be calculated by n×0800h+0320h.

Thus the thumbnail image data of the plural image files 432(1) to 432(n) can be individually read by the start addresses of such data, the printer 102 can independently obtain the necessary thumbnail image from the image files held in the digital camera 101.

Figure 28:
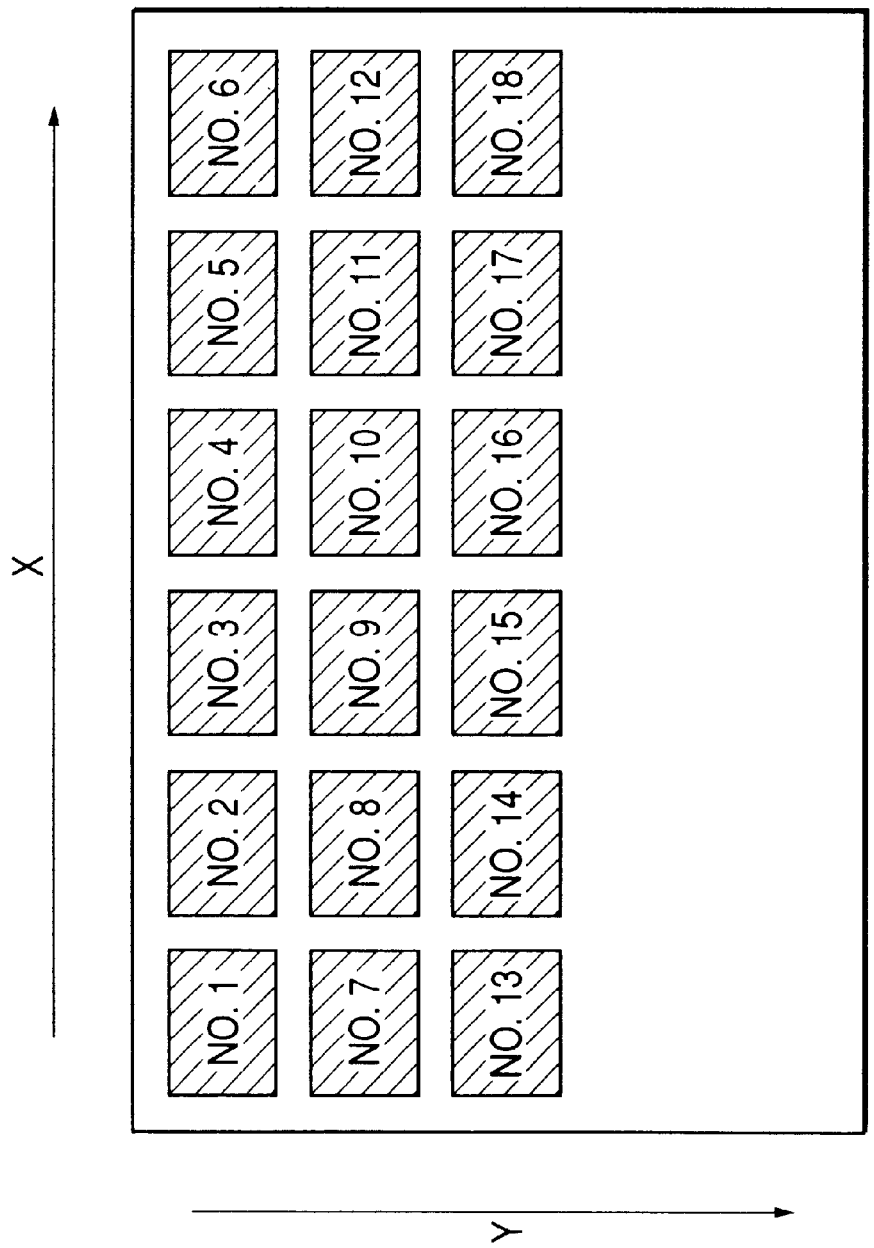
FIG. 28 is a view showing an example of image rearrangement for index printing of the plural thumbnail images acquired in the above-mentioned thumbnail image extracting process.

FIG. 28 shows an example of the arrangement of the thumbnail images in case of print output (index printing) by the printer 102 of the thumbnail images, fetched into the printer 102 by the aforementioned configuration.

The printer 102 executes index printing of the thumbnail images read from the digital camera 101, after sorting the thumbnail image data in a data format for index printing (image rearrangement).

In the example shown in FIG. 28, the first to sixth thumbnail images (Nos. 1 to 6) are arranged in succession in the X-direction from the upper left corner, and then the seventh to twelfth thumbnail images (Nos. 7 to 12) are arranged in the X-direction from the upper left with a displacement in the Y-direction.

The rearrangement of the thumbnail images explained in the foregoing is executed in the printer 102 which has read the thumbnail image data from the digital camera 101.

The printer 102 rearranges the thumbnail image data, read from the digital camera 101, so as to form index data of a sheet.

Thus the thumbnail images held in the digital camera 101 are printed as index data of a sheet from the printer 102.

Figure 29:
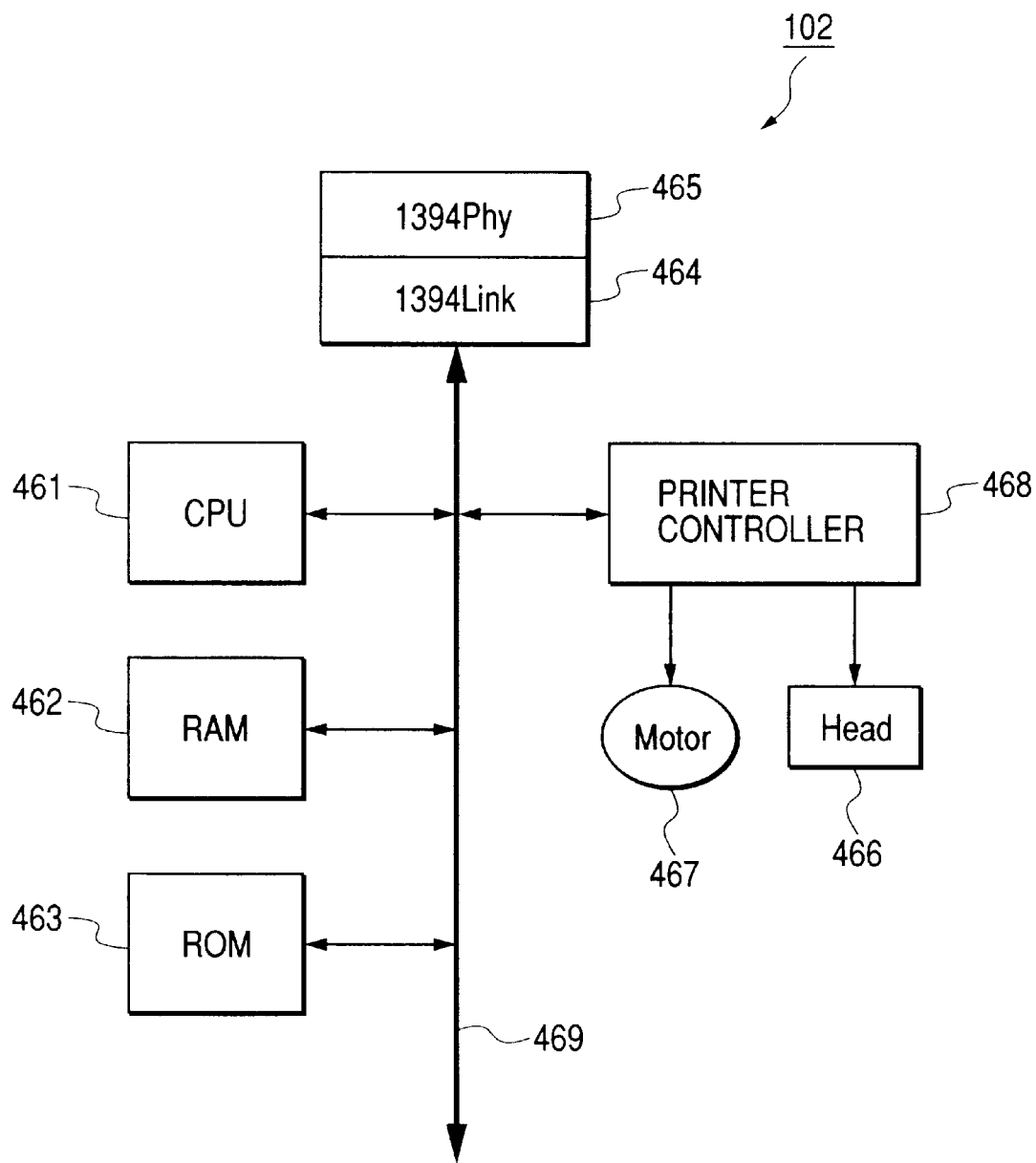
FIG. 29 is a block diagram showing the configuration of the above-mentioned printer.

The printer 102, executing the above-mentioned image rearrangement and the index printing, for example has a configuration as shown in FIG. 29.

The printer 102 is provided with a CPU 461 controlling the function of the entire printer 102, a RAM 462 to be used in the processing of thumbnail image data and for data transfer, a ROM 463 storing programs and data for controlling the function of the CPU 461, a 1394PHY 465 which is a physical layer controller for realizing a 1394 interface, a 1394LINK 464 which is a link layer controller for realizing a 1394 interface, a printer controller 468 for controlling the function of a printer unit (not shown), a head unit 466 incorporated in the printer unit, and a motor unit 467 of the printer unit, and these components are connected by a bus 469 so as to be capable of mutual communication.

In such configuration, the printer 102 executes processing utilizing the CPU 461, ROM 463 and RAM 462 on the image fetched from the digital camera 101 through the 1394 interface (1394POHY 465 and 1394LINK 464), and prints thus processed image by driving the motor 467 and the head 466 of the printer unit through the printer controller 468.

Figure 30:
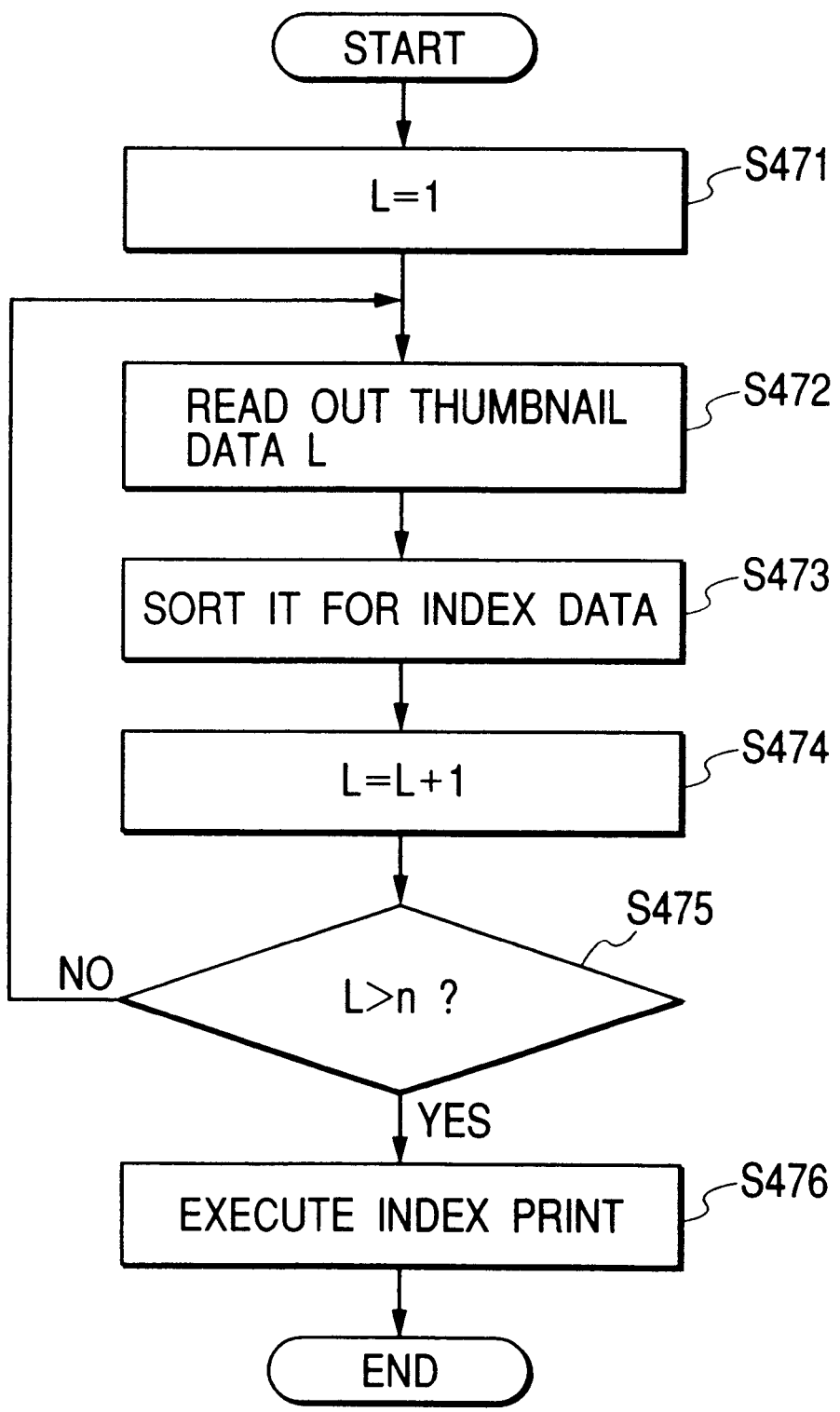
FIG. 30 is a flow chart showing the function of the above-mentioned printer.

FIG. 30 shows the function of the printer 102 in executing the aforementioned index printing.

At first a counter L for the image file held in the digital camera 101 is initialized (step S471).

The counter L indicates the number of the image files 451(1), 451(2), 451(3), . . . as shown in FIGS. 25 and 27, and has an initial value "1".

Then, based on the address/size information of the buffer 411 informed from the digital camera 101 (namely the format information of the image data held in the digital camera 101), the thumbnail image of the image file 451(L) indicated by the counter L is acquired from the digital camera 101 by a process according to the flow chart shown in FIG. 26 (step S472).

Then the thumbnail images acquired in the step S472 are rearranged in the manner as shown in FIG. 28, thereby forming data for index printing on the RAM 462 (step S473).

Then the counter L is step increased in order to execute the process of the steps S472 and S743 for a next image file 451 (L+1) (step S474).

Then there is discriminated whether the value of the counter L after the increment in the step S474 exceeds the total number (n) of the image files held in the digital camera 101 (step S475).

If the discrimination of the step S475 identifies that a condition "L>n" is not satisfied, namely if an unprocessed image file still exists in the digital camera 101, the sequence returns to the step S472 and repeats the subsequent steps.

If the discrimination of the step S475 identifies that a condition "L>n" is met, namely if the thumbnail images have been read from all the image files 451(1), 451(2), 451(3), . . . , 451(n) present in the digital camera 101 and have been rearranged, the index print data formed on the RAM 462 are printed.

In the foregoing explanation, the thumbnail images of all the image files present in the digital camera 101 are fetched, but it is also possible to read the thumbnail images of only the images designated by the user.

Also the number of images to be arranged within the image area may be made selectable, and, according to such number, there may be controlled the number of images to be read or the arrangement thereof.

In the present invention, as explained in the foregoing, the held information (photographed image and thumbnail image thereof) in another device (digital camera etc.) is fetched therefrom, based on the format information (address, buffer etc. of a buffer holding the information), informed from such another device, of the held information in such another device.

It is thus rendered possible to arbitrarily fetch the information held in another device.

Also in case of rearranging the plural held information fetched from another device in an arbitrary order and collectively outputting such information (for example by printing), it is rendered possible to easily recognize the information held in such another device and to efficiently select the desired held information.

More specifically, in the image data exchange between the digital camera (first device) and the printer (second device), the digital camera informs the format information of the image file (including the photographed image and the thumbnail image formed by reducing the size of the photographed image) held in the internal memory of the digital camera, to the printer.

Thus, the printer can directly fetch, for example utilizing the pull-type data transfer method, only the thumbnail image from the image file held in the internal memory of the digital camera.

It is thus rendered possible to simplify the negotiation process between the devices in the data transfer.

Also in the printer, in case of forming an index print (printing of index image) by editing the thumbnail images fetched from the digital camera, it is possible to easily select the desired image from the plural photographed images held in the digital camera.

It is therefore possible to improve the operability.

Second Embodiment

Figure 31:
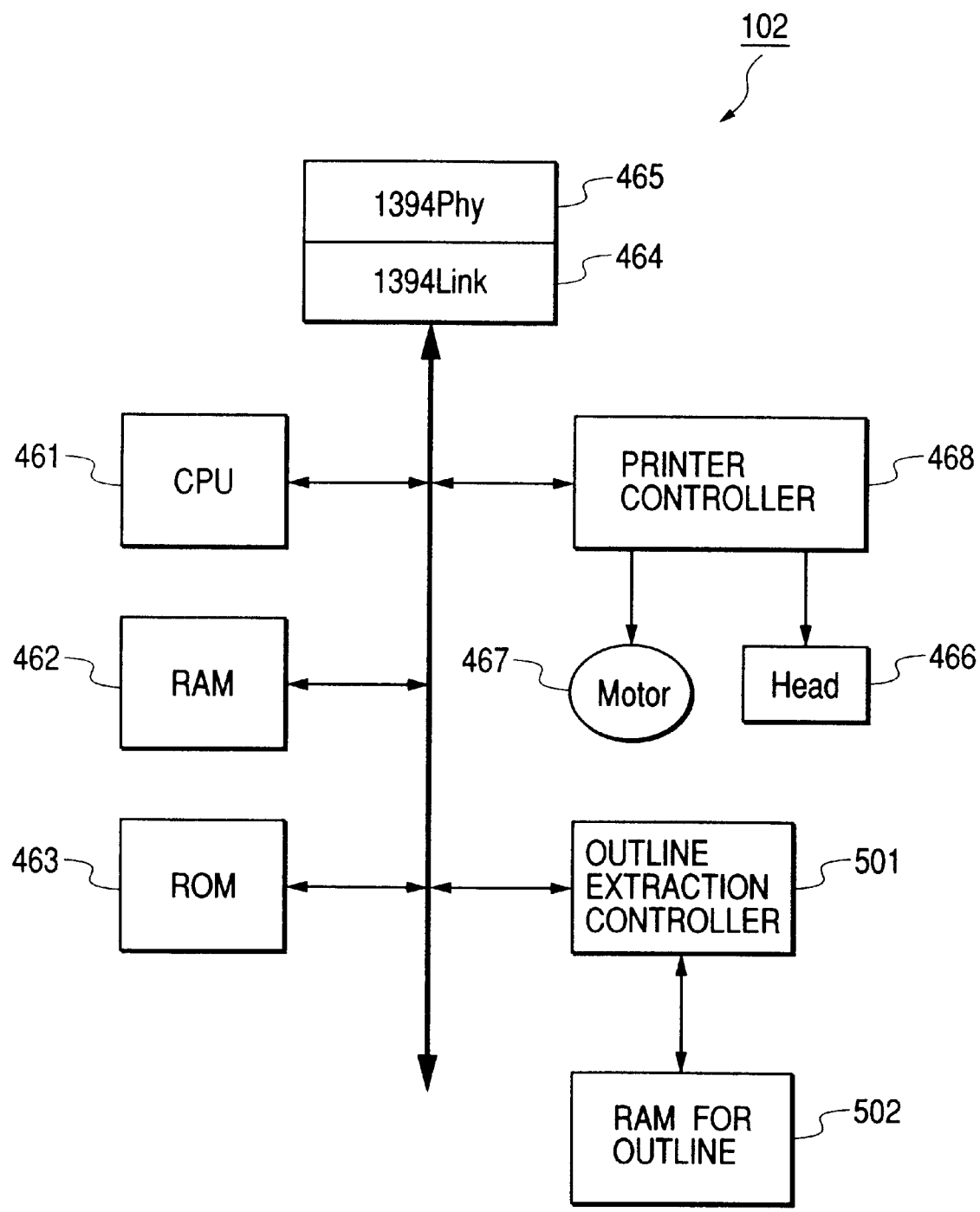
FIG. 31 is a block diagram showing the configuration of the above-mentioned printer.

In the present embodiment, the printer 102 executing the image arrangement and the index printing has a configuration for example as shown in FIG. 31, wherein components equivalent to those in the first embodiment are represented by corresponding numbers.

More specifically, the printer 102 is provided, as shown in FIG. 31, with a CPU 461 controlling the function of the entire printer 102, a RAM 462 to be used in the processing of thumbnail image data and for data transfer, a ROM 463 storing programs and data for controlling the function of the CPU 461, a 1394PHY 465 which is a physical layer controller for realizing a 1394 interface, a 1394LINK 464 which is a link layer controller for realizing a 1394 interface, a printer controller 468 for controlling the function of a printer unit (not shown), a head unit 466 incorporated in the printer unit, and a motor unit 467 of the printer unit, and these components are connected by a bus 469 so as to be capable of mutual communication.

In the present embodiment, the printer 102 is further provided with an outline extraction controller 501 for executing an outline extraction process on the image data, and an outline RAM 502 to be used in the outline extraction process in the outline extraction controller 501.

The outline extraction controller 501 executes an outline extraction process to be explained later in detail, on the index data given by the CPU 461 and stored in the RAM 462.

The outline RAM 502 is rendered capable of holding the image data of a frame (index data of a sheet) in which 1 bit is assigned to each pixel.

In such configuration, the printer 102 executes processing utilizing the CPU 461, ROM 463 and RAM 462 on the image fetched from the digital camera 101 through the 1394 interface (1394POHY 465 and 1394LINK 464), then executes an outline extraction process and prints thus processed image by driving the motor 467 and the head 466 of the printer unit through the printer controller 468.

Figure 32:
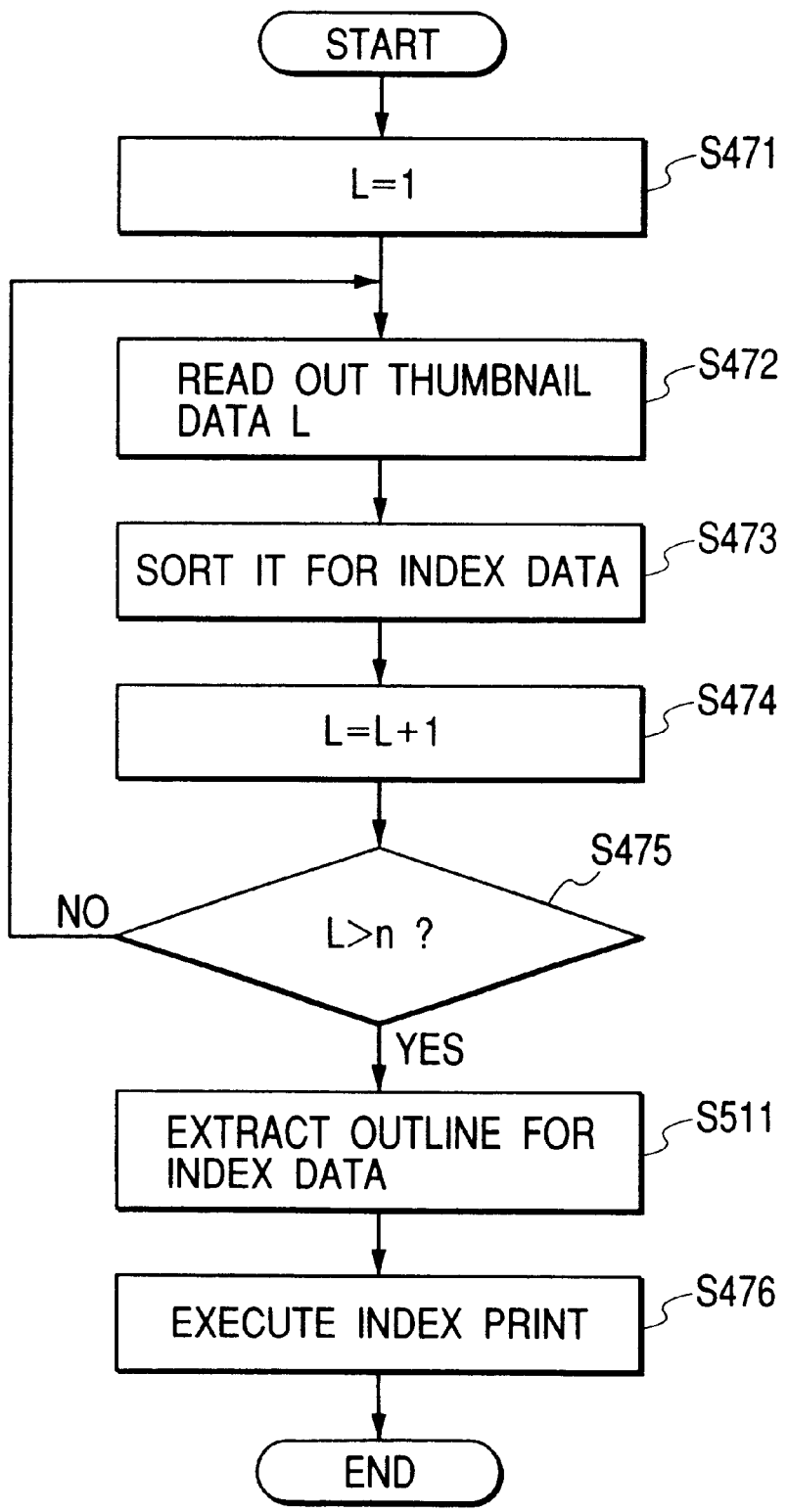
FIG. 32 is a flow chart showing the function of the above-mentioned printer.

FIG. 32 shows the function of the printer 102 in executing the aforementioned index printing.

At first a counter L for the image file held in the digital camera 101 is initialized (step S471).

The counter L indicates the number of the image files 451(1), 451(2), 451(3), . . . as shown in FIGS. 25 and 27, and has an initial value "1".

Then, based on the address/size information of the buffer 411 informed from the digital camera 101 (namely the format information of the image data held in the digital camera 101), the thumbnail image of the image file 451(L) indicated by the counter L is acquired from the digital camera 101 by a process according to the flow chart shown in FIG. 26 (step S472).

Then the thumbnail images acquired in the step S472 are rearranged in the manner as shown in FIG. 28, thereby forming data for index printing on the RAM 462 (step S473).

Then the counter L is step increased in order to execute the process of the steps S472 and S473 for a next image file 451(L+1) (step S474).

Then there is discriminated whether the value of the counter L after the increment in the step S474 exceeds the total number (n) of the image files held in the digital camera 101 (step S475).

If the discrimination of the step S475 identifies that a condition "L>n" is not satisfied, namely if an unprocessed image file still exists in the digital camera 101, the sequence returns to the step S472 and repeats the subsequent steps.

If the discrimination of the step S475 identifies that a condition "L>n" is met, namely if the thumbnail images have been read from all the image files 451(1), 451(2), 451(3), . . . , 451(n) present in the digital camera 101 and have been rearranged, the outline extraction process is applied on the index print data formed on the RAM 462, and the index print data after such process are written in the outline RAM 502 (step S511).

The image after the outline process is preferably made a pale colored image, in order to effectively reduce the burden of the subsequent image processing.

Then the index print data written in the outline RAM 502 are printed (step S476).

Figure 33:
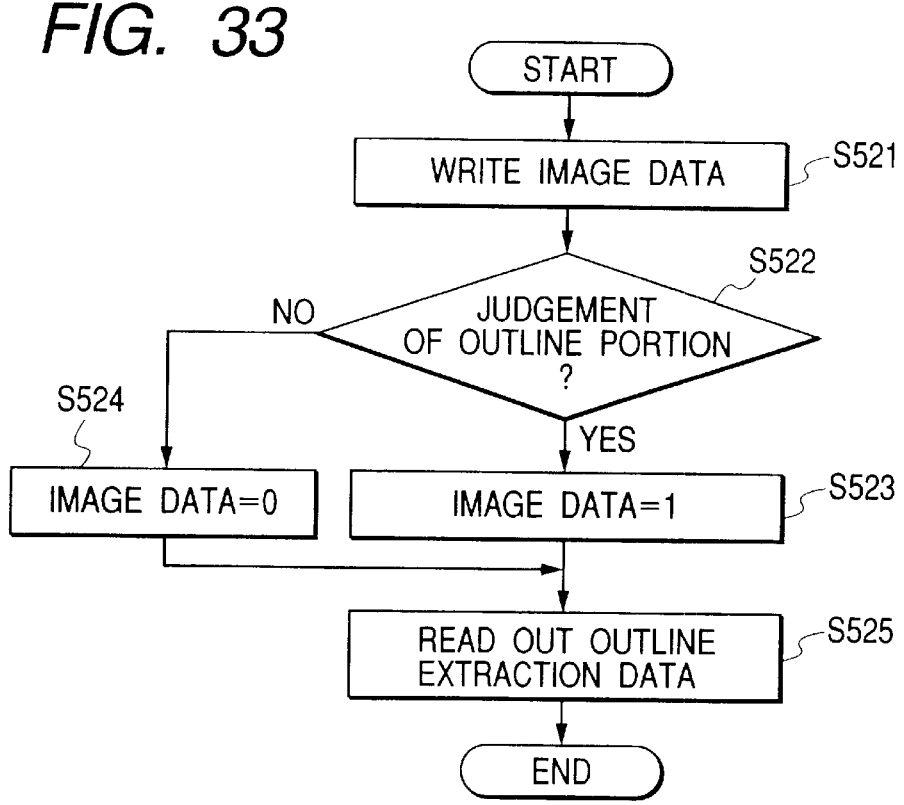
FIG. 33 is a flow chart showing an outline extracting process in the function of the above-mentioned printer.

FIG. 33 shows the details of the outline extraction process in the step S511 in the flow chart shown in FIG. 32.

At first, the CPU 461 supplies the outline extraction controller 501 with index data, stored in the RAM 462, as the object data for processing.

The outline extraction controller 501 writes the index data from the CPU 461 in the outline RAM 502 (step S521).

Then the outline extraction controller 501 reads the index data in the outline RAM 502 pixel by pixel, and discriminates whether the read pixel is a pixel representing the outline (outline pixel) of an object on the thumbnail image constituting the index data (step S522).

More specifically, there is for example calculated the average value of the image data of three colors (R, G, B) for each pixel, then such average value of an object pixel is compared with the average value in the surrounding pixels, and there is discriminated whether the difference exceeds a predetermined value.

If the step S522 identifies that the object pixel is an outline pixel, the object pixel is given "1" (step S523), but, if not, the object pixel is given "0" (step S524).

Then the object pixel, given "1" or "0" by the step S523 or S524, is written in the outline RAM 502.

Thus there are formed index data constituted by the thumbnail images in which the outline of the object is extracted (namely index data after the outline extraction process).

Such index data after the outline extraction process are read and printed in the step S476 shown in FIG. 32 (step S525).

Figure 34:
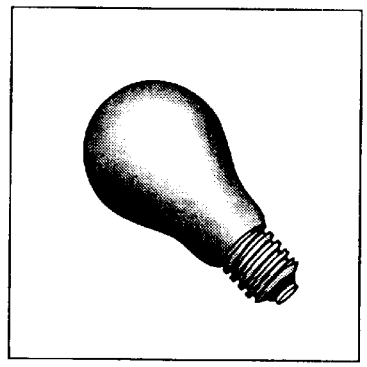
FIG. 34 is a view showing an example of the image prior to the above-mentioned outline extracting process.
Figure 35:
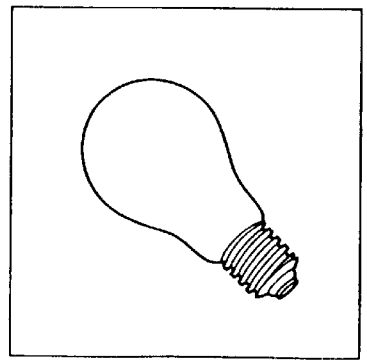
FIG. 35 is a view showing an example of the image after the above-mentioned outline extracting process.

FIGS. 34 and 35 respectively show an image prior to the outline extraction process (original image) and an image after the outline extraction process.

As an example, an image shown in FIG. 34 exists as a thumbnail image constituting the index data (data prior to the outline extraction process) stored in the RAM 462, such image is converted after the outline extraction process into an image as shown in FIG. 35, on the index data (data after the outline extraction process) stored in the outline RAM 502.

By extracting the outline of the thumbnail image, there can be omitted the density gradation of such image. It is thus rendered possible to simplify the image processing in printing the index data constituted by such thumbnail image, thereby reducing the process time.

Also the omission of the density gradation of the image allows to increase the speed of printing output.

Particularly it is possible to reduce the complexity of the color image processing, resulting from the increase in the number of density levels of the image and the increase in the number of density levels of the printer.

In the foregoing, the outline extraction process is executed in the printer, but it is also possible to execute such process in the camera.

More specifically, there is provided an image processing method for the printer constituting the second device for fetching the image data, held in the digital camera constituting the first device, through communication means and outputting such image data, the method comprising:

an informing step in which the first device informs the second device of the format information of the image data held by the first device; a fetching instruction step in which the second device instructs fetching of the image data from the first device based on the information informed by the information step; an outline extraction step in which the first device executes an outline extraction process on the image data instructed by the fetching instruction step; and an output step in which the first device outputs, through the communication unit, index information after the processing by the outline extraction step.

In such case, the burden of processing in the camera increases, but the amount of data transmitted to the printer decreases, so that there can be reduced the communication time and the data amount of communication. Such method is therefore effective in a system which is charged by the communication time or by the number of communication packets.

As explained in the foregoing, the present embodiment enables high-speed print output and is particularly effective in case of forming an index image in order to simply refer to the thumbnail images constituting the index data and to select an image to be printed later with a high image quality, since the index image need not be of a high image quality and an outline image is sufficient for such purpose.

Also in the present embodiment, the aforementioned outline extraction process may be executed according to an instruction from the user.

It is thus rendered possible to select whether or not to execute the outline extraction process on the index image according to the situation, thereby meeting the purpose of utilization of the index image by the user (for example a case of requiring a high-quality color image or a case of requiring a high output speed with a low image quality).

In the present embodiment, the outline extraction process is executed after the index data are formed from the thumbnail image fetched from the digital camera 101, but it is also possible, for example, to execute the outline extraction process at the formation of the index data.

More specifically, it is possible, after executing the outline extraction process on each thumbnail image, to form the index data by arranging the thumbnail images after such process.

The objects of the present invention can naturally be attained also in a case where a memory medium storing the program codes of a software realizing the functions of the host and terminal devices of the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the novel functions of the present invention, and the memory medium storing the program codes constitutes the present invention.

The memory medium storing such program codes can be, for example, a ROM, a floppy disk, a hard disk, an optical disk, a magnetooptical disk, a CD-ROM, a CD-R, a magnetic tape, or a non-volatile memory card.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

In the present invention, as explained in the foregoing, the format information (address, size etc. of a buffer holding the image information), informed from another device (digital cameral etc.), of the image information (thumbnail image etc.) held in such another device, the image information held in such another device is fetched in succession and thus fetched image information is rearranged in an arbitrary order and collectively outputted (for example printing of the index information).

In such operation, the information (index information) to be collectively outputted is outputted after the execution of a process for extracting the outline from the image information constituting such information.

Otherwise, at the fetching of the image information from the another device, there is executed a process of extracting the outline from such image information, and the image information after such process is rearranged in an arbitrary order and outputted collectively.

Such configuration allows to arbitrarily fetch the image information held in the another device.

It is also rendered possible to easily recognize the image information held in another device and to efficiently select the desired image information.

Particularly according to the present invention, the density gradation is omitted in the image information constituting the index information, so that the image processing can be simplified in outputting such index information and the process time can be accordingly reduced.

Also the speed of the print output can be increased.

More specifically, in the image data exchange between the digital camera (first device) and the printer (second device), the digital camera informs the printer of the format information of the image file (including the photographed image, thumbnail image obtained by reducing the photographed image etc.) held in the internal memory of the digital camera.

The printer can directly fetch, by the pull-type image transfer method, only the thumbnail image from the image file held in the internal memory of the digital camera.

It is thus made possible to simplify the negotiation process between the devices in the data transfer.

Also the printer edits the thumbnail images fetched from the digital camera to form data for index printing (index data), and executes the outline extraction process on such index data.

Otherwise the printer executes the outline extraction process on the thumbnail images fetched from the digital camera, and edits the thumbnail images after such process to form the data for index printing (index data).

Thus the thumbnail images constituting the index data become outline images lacking the density gradation.

Thus the image processing in printing such index data can be simplified.

It is also possible to easily select the desired image from many photographed images held in the digital camera, whereby the operability can be improved.

In the foregoing embodiments, there is employed connection based on the IEEE1394, but there may naturally be employed the wireless or infrared communication such as bluetooth.

There may also be utilized a telephone channel such as a portable telephone.

The present invention is not limited to the foregoing embodiments but is subject to various modifications within the scope and spirit of the appended claims.

What is claimed is:

1. A communication apparatus comprising:

communication means for fetching format information representing a storage area of held information, held in another device, by communication with the another device; and control means for controlling the fetching of the held information, based on the format information, fetched from the another device, of the held information.

2. A communication apparatus according to claim 1, wherein said control means selectively fetches arbitrary information from the held information.

3. A communication apparatus according to claim 1, further comprising:

output means for arranging plural information fetched by said communication means in an arbitrary order and collectively outputting the plural information.

4. A communication apparatus according to claim 3, wherein said output means has a print output function.

5. A communication apparatus according to claim 1, wherein the held information includes image information and thumbnail image information of the image information.

6. A communication apparatus according to claim 1, wherein said communication means executes communication by a serial bus based on the IEEE1394 standard.

7. A communication apparatus according to claim 1, wherein the another device is a digital camera.

8. An image processing apparatus comprising:

communication means for fetching format information representing a storage area of held information, held in another device, by communication with the another device; and control means for controlling the fetching of the held information, based on the format information, informed from the another device, of the held information.

9. An image processing apparatus according to claim 8, further comprising:

printing means for fetching held information held in the another device and printing the held information.

10. A communication system in which plural devices mutually communicate, comprising:

informing means for informing format information representing a storage area of image information held by a first device among the plural devices to a second device; and fetching means for the second device fetching data from the first device based on the format information informed by the informing means.

11. A communication method for transferring image data at least between a first device and a second device, comprising:

an informing step, in which the first device informs the second device of format information representing a storage area of image data held by the first device; and a fetching step, in which the second device fetches data from the first device based on the format information informed by said informing step.

12. A communication method according to claim 11, wherein said fetching step selectively fetches data from the first device.

13. A communication method according to claim 11, further comprising:

an output step, of preparing index data from the plural image data fetched by said fetching step and outputting the index data by printing.

14. A communication method according to claim 11, wherein the image data includes data of a thumbnail image.

15. A communication method according to claim 11, wherein said transferring is based on the IEEE1394 standard.

16. A communication method according to claim 11, further comprising:
   a transfer step, of executing data transfer through a serial bus, according to the pull-type data transfer method of the direct print protocol.

17. A storage medium storing process-implementable instructions for controlling a process to carry out the method on claim 11.

18. An image processing apparatus having a function of fetching image information held in another device through communication means, comprising:
   information fetching means for fetching the image information from the another device, based on format information, informed from the another device, of the held image information;
   information generation means for generating index information in which plural image information fetched by said information fetching means are arranged in an arbitrary order;
   outline extraction means for executing an outline extraction process on the image information constituting the index information generated by said information generation means; and
   information output means for outputting the index information after the processing by said outline extraction means.

19. An image processing apparatus having a function of fetching image information held in another device through communication means, comprising:
   information fetching means for fetching the image information from the another device, based on format information, informed from the another device, of the held image information;
   outline extraction means for executing an outline extraction process on the image information fetched by said information fetching means;
   information generation means for generating index information in which the plural image information after processing by said outline extraction means are arranged in an arbitrary order; and
   information output means for outputting the index information generated by said information generation means.

20. An image processing apparatus according to claim 19, wherein said information fetching means is capable of selectively fetching arbitrary image information from the another device.

21. An image processing apparatus according to claim 19, wherein said information output means at least has a print output function.

22. An image processing apparatus according to claim 19, wherein the image information includes a thumbnail image.

23. An image processing apparatus according to claim 19, wherein said communication means includes a serial bus based on the IEEE1394 standard.

24. An image processing apparatus according to claim 19, wherein the another device is a digital camera.

25. An image processing apparatus according to claim 19, wherein said outline extraction means executes the outline extraction process based on an external instruction, and said information output means outputs index information which is not yet processed by said outline extraction means or processed index information.

26. An image processing apparatus according to claim 19, wherein the image subjected to the outline extraction process by said outline extraction means is a pale-colored image.

27. An image processing method in which image data held in a first device are fetched by a second device through communication means and are outputted, the method comprising:
   an informing step, in which the first device informs the second device of format information of the image data held by the first device;
   an information fetching step, in which the second device fetches the image data from the first device, based on the information informed by said informing step;
   an information generation step, in which the second device generates index information in which the plural image data fetched by said fetching step are arranged in an arbitrary order;
   an outline extraction step, in which the second device executes an outline extraction process on the image formation constituting the index information generated by said information generation step; and
   an information output step, in which the second device outputs the index information after processing by said outline extraction step.

28. An image processing method in which image data held in a first device are fetched by a second device through a serial bus and are outputted by the second device, the method comprising:
   an informing step, in which the first device informs the second device of format information of the image data held by the first device;
   an information fetching step, in which the second device fetches the image data from the first device, based on the information informed by the informing step;
   an outline extraction step, in which the second device executes an outline extraction process on the image information fetched by said information fetching step;
   an information generation step, in which the second device generates index information in which the plural image information after processing in said outline extraction step are arranged in an arbitrary order; and
   an information output step, in which the second device outputs the index information generated by said information generation step.

29. An image processing method according to claim 28, wherein, in said information fetching step, the second device selectively fetches image data from the first device.

30. An image processing method according to claim 28, wherein said information output step includes a step of outputting the index information by printing.

31. An image processing method according to claim 28, wherein the image data includes data of a thumbnail image of an arbitrary image.

32. An image processing method according to claim 28, wherein the serial bus includes an interface based on the IEEE1394 standard.

33. An image processing method according to claim 28, further comprising:
   a transfer step, of executing transfer of the image data according to the pull-type data transfer method of the direct print protocol.

34. An image processing method according to claim 28, further comprising:

a selection step, of selecting whether or not to execute the process of said outline extraction step;

wherein said information output step includes a step of outputting index information after processing by said outline extraction step or unprocessed index information.

35. A storage medium storing processor-implementable instructions for controlling a process to carry out the method on claim 18.

36. A storage medium storing processor-implementable instructions for controlling a process to carry out the method on claim 27.

37. An image processing method in which image data held in a first device are fetched by a second device through communication means and are outputted, the method comprising:

an informing step, in which the first device informs the second device of format information of the image data held by the first device;

a fetching instruction step, in which the second device instructs fetching of the image from the first device, based on the information informed by said informing step;

an outline extraction step, in which the first device executes an outline extraction process on the image data instructed by said fetching instruction step; and an output step, in which the first device outputs index information after processing by said outline extraction step, through the communication means.

38. An image processing method according to claim 37, further comprising:

an information generation step, in which the second device generates index information in which the plural image data fetched by said fetching step are arranged in an arbitrary order.

39. A storage medium storing processor-implementable instructions for controlling a process to carry out the method on claim 37.

* * * * *